(12) United States Patent
Johnson

(10) Patent No.: US 7,376,628 B2
(45) Date of Patent: May 20, 2008

(54) METHODS AND SYSTEMS FOR CARRYING OUT CONTINGENCY-DEPENDENT PAYMENTS VIA SECURE ELECTRONIC BANK DRAFTS SUPPORTED BY ONLINE LETTERS OF CREDIT AND/OR ONLINE PERFORMANCE BONDS

(75) Inventor: Richard C. Johnson, Poquott, NY (US)

(73) Assignee: Oracle International Corporation, Redwood Shores, CA (US)

( * ) Notice: Subject to any disclaimer, the term of this patent is extended or adjusted under 35 U.S.C. 154(b) by 598 days.

(21) Appl. No.: 10/071,066

(22) Filed: Apr. 12, 2002

(65) Prior Publication Data

US 2004/0172368 A1   Sep. 2, 2004

Related U.S. Application Data

(60) Provisional application No. 60/285,771, filed on Apr. 23, 2001.

(51) Int. Cl.
*H04K 1/00* (2006.01)
*H04L 9/00* (2006.01)
*G06Q 10/00* (2006.01)
*G06Q 40/00* (2006.01)

(52) U.S. Cl. .............................. 705/67; 705/1; 705/39
(58) Field of Classification Search ............... 705/1, 705/26, 50, 35, 39, 37, 69
See application file for complete search history.

(56) References Cited

U.S. PATENT DOCUMENTS 5,053,607 A * 10/1991 Carlson et al. ............... 705/18
5,187,750 A *  2/1993 Behera ......................... 382/140

(Continued)

FOREIGN PATENT DOCUMENTS

JP    10-340302    12/1998

(Continued)

OTHER PUBLICATIONS http://www.sba.gov/financing/bonds/whatis.html.*

(Continued)

*Primary Examiner*—Calvin Loyd Hewitt, II
(74) *Attorney, Agent, or Firm*—Young Law Firm, P.C.

(57) ABSTRACT

Methods of carrying out an electronic transaction that includes payment via a secure electronic draft, include steps of establishing a secure computer site that includes a representation of the draft, the site being controlled by a financial service provider and accessible only to authenticated parties to the transaction; creating a first online letter of credit linked to a drawer of the draft and including predetermined terms, satisfaction of the terms being a precondition to the financial service provider extending credit to the drawer; authenticating each party to the draft requesting access to the draft represented at the computer site, and releasing payment on the draft to a drawee of the draft. At least a portion of the released payment may originate from the credit extended to the drawer. An online performance bond may define liquidated damages to be paid to a drawer upon non-performance of the drawee or to the drawee upon non-performance of the drawer. The payment may be released to the drawee of the draft when both drawer and drawee perform, or the liquidated damages may be paid to the drawer upon non-performance of the drawee or to the drawee upon non-performance of the drawer. The online letter of credit may be the basis for modeling all trade finance products, including various types of letters of credit, performance bonds and insurance in a variety of instances. iDraft™ contingencies plus terms and conditions may define all payment connected trade finance products. Individual products may be defined through proper configuration of the present iDraftC™ functionality and software.

20 Claims, 10 Drawing Sheets

U.S. PATENT DOCUMENTS

| | | | | |
|---|---|---|---|---|
| 5,426,281 | A | * | 6/1995 | Abecassis .................. 235/379 |
| 5,604,341 | A | * | 2/1997 | Grossi et al. ............... 235/379 |
| 5,677,955 | A | | 10/1997 | Doggett et al. |
| 5,717,989 | A | * | 2/1998 | Tozzoli et al. ................ 705/37 |
| 5,794,207 | A | * | 8/1998 | Walker et al. ................. 705/1 |
| 5,903,721 | A | | 5/1999 | Sixtus |
| 5,920,847 | A | | 7/1999 | Kolling et al. |
| 6,016,484 | A | | 1/2000 | Williams et al. |
| 6,029,150 | A | | 2/2000 | Kravitz |
| 6,041,315 | A | | 3/2000 | Pollin |
| 6,119,105 | A | | 9/2000 | Williams |
| 6,141,653 | A | * | 10/2000 | Conklin et al. ............... 705/80 |
| 6,157,920 | A | | 12/2000 | Jakobsson et al. |
| 6,185,683 | B1 | * | 2/2001 | Ginter et al. ............... 713/176 |
| 6,208,978 | B1 | * | 3/2001 | Walker et al. ................ 705/38 |
| 6,233,565 | B1 | | 5/2001 | Lewis et al. |
| 6,330,551 | B1 | * | 12/2001 | Burchetta et al. ............ 705/80 |
| 6,343,738 | B1 | * | 2/2002 | Ogilvie ....................... 235/381 |
| 6,477,513 | B1 | * | 11/2002 | Walker et al. ................ 705/76 |
| 6,529,885 | B1 | | 3/2003 | Johnson |
| 6,839,690 | B1 | * | 1/2005 | Foth et al. .................... 705/53 |
| 6,865,559 | B2 | * | 3/2005 | Dutta ........................... 705/75 |
| 7,085,735 | B1 | * | 8/2006 | Hall et al. .................... 705/26 |
| 2001/0032168 | A1 | | 10/2001 | Adamson et al. |
| 2002/0073049 | A1 | | 6/2002 | Dutta |
| 2003/0028491 | A1 | * | 2/2003 | Copper |

FOREIGN PATENT DOCUMENTS

| | | |
|---|---|---|
| JP | 11-3387 | 1/1999 |
| JP | 11-143953 | 5/1999 |
| JP | 2000-40115 | 2/2000 |
| JP | 2000-137736 | 5/2000 |
| JP | 2002/279198 | 9/2002 |
| WO | WO 99/41690 A1 | 8/1999 |
| WO | WO 00/30007 | 5/2000 |
| WO | WO 00/052552 | 9/2000 |
| WO | WO 00/79367 A1 | 12/2000 |
| WO | WO 01/018720 A1 | 3/2001 |

OTHER PUBLICATIONS

"Internet has become home for many mortage shoppers", Tribune Media Services, The Plain Dealer, Cleveland Ohio, Oct. 18, 1999.*

International Search Report mailed Feb. 20, 2001, in related international application No. PCT/US00/26054, filed Sep. 22, 2000 (2pgs).

International Preliminary Examination Report mailed Jan. 3, 2002, in related international application No. PCT/US00/26054, filed Sep. 22, 2000 (15pgs).

Written Opinion mailed Aug. 3, 2001, in related international application No. PCT/US00/26054, filed Sep. 22, 2000 (5pgs).

International Search Report mailed Oct. 3, 2002, in corresponding international application No. PCT/US00/07735, filed Mar. 14, 2002 (4pgs).

Allied Irish Bank, AIB Trade Finance—Product & Sevices, http://www.aibtradefinance.com/tf/bondsOutGoing.asp, Copyright 2000, see website.

International Preliminary Examination Report mailed Feb. 24, 2004, in corresponding international application No. PCT/US00/07735, filed Mar. 14, 2002 (4pgs).

Written Opinion mailed Apr. 11, 2003, in corresponding international application No. PCT/US02/07735, filed Mar. 14, 2002 (4pgs).

Final Office Action mailed Dec. 6, 2000 in parent U.S. Appl. No. 09/405,741, filed Sep. 24, 1999.

Final Office Action mailed Mar. 21, 2001 in parent U.S. Appl. No. 09/272,056, filed Mar. 18, 1999.

Final Office Action mailed Oct. 23, 2001 in parent U.S. Appl. No. 09/272,056, filed Mar. 18, 1999.

Final Office Action mailed Apr. 15, 2002 in parent U.S. Appl. No. 09/272,056, filed Mar. 18, 1999.

Examiner's Answer to Appeal Brief mailed Nov. 15, 2002 in parent U.S. Appl. No. 09/272,056, filed Mar. 18, 1999.

Decision on Appeal mailed Jul. 15, 2004 in parent U.S. Appl. No. 09/272,056, filed Mar. 18, 1999.

Office Action mailed Dec. 12, 2003, in related Canadian Application No. 2,384,802.

Office Action mailed Dec. 22, 2004, in related Canadian Application No. 2,384,802.

Translation of Office Action mailed Jun. 17, 2005, in related Japanese Application No. 2001-525620.

The Burton Group, "Network Strategy Report LDAP version 3: The Maturing of the Intertnet Directory Standard" v1 (Jan. 14, 1998).

Howard Wolinsky, "Parts Trader Gets on Fast Track", http://web.archive.org/web/19999021007 1416/www.fastparts.com/news/art, Chicago Sun Times, printed Jun. 25, 2002.

Oracle Business White Paper, Capturing Electronic Commerce Opportunities (Nov. 1998).

Office Action received in related Japanese Application No. 584138/2002.

Supplemental European Search Report completed Sep. 28, 2005 in related European Application No. EP 00 96 5325.

Examiner's report No. 2 dated Aug. 24, 2007, in related Australian Application No. 2002250316.

* cited by examiner

METHODS AND SYSTEMS FOR CARRYING OUT CONTINGENCY-DEPENDENT PAYMENTS VIA SECURE ELECTRONIC BANK DRAFTS SUPPORTED BY ONLINE LETTERS OF CREDIT AND/OR ONLINE PERFORMANCE BONDS

BACKGROUND OF THE INVENTION

1. Field of the Invention

This invention relates to the field of electronic commerce (hereafter "e-commerce"). More particularly, the present invention relates to methods and systems for directory-authenticated electronic transactions including contingency-dependent payments via secure electronic bank drafts.

2. Description of the Related Art

The network of computers and networks commonly known as the Internet, initially developed as a military and academic communications tool, has now matured into a global communications medium. The explosive growth of the Internet, together with the increasingly ubiquitous availability of high bandwidth access thereto, has spurred efforts in adapting this medium for commercial purposes. The twin developments of the World Wide Web (hereafter "Web") and the software tools for navigating the Web known as "browsers" have been instrumental in facilitating popular acceptance of the buying and selling of goods and services on the Internet. Currently, a person wishing to buy goods and/or services on the Web (hereafter "Web buyer") must first find the Universal Resource Locator (hereafter "URL") of the merchant of interest (hereafter "Web seller"), typically using a search engine or a portal. Alternatively, the user may learn the URL of a seller from an advertisement or may store the URL obtained through whatever source and visit the seller site directly without going through a portal or search engine. Thereafter, the Web buyer must navigate to the Web seller's Web site, using his or her Web browser. After selecting the product the Web buyer wishes to purchase, the Web buyer is typically invited to fill out a lengthy electronic form on the Web seller's site. Such electronic forms usually request personal and confidential information, including at least the user's name, address, telephone numbers, email address, and credit card information. The buyer, moreover, must log in separately in each Web site with which the buyer wishes to purchase goods and services. At each such Web site, the buyer must fill in the above-listed personal and confidential information. In effect, the buyer must fill out a credit application for each Web seller, whether or not the buyer truly wishes or needs credit. Often, the Web buyer is requested or invited to select a personal and unique identification tag (hereafter "ID") and a password. Such ID and password pairs may then allow the Web buyer to bypass much of the data entry in the Web seller's electronic form upon his or her next visit to the Web seller's site. This, however, entails that the Web seller collects and stores the personal and billing information for each Web buyer. Although the majority of Web sellers may carefully secure and safeguard this wealth of personal information, the possibility exists that such information may be used for purposes other than originally contemplated by the Web buyer. Credit or charge card information is particularly sensitive to fraud and misuse. Indeed, a stolen (or misappropriated) but otherwise valid credit card number may be fraudulently used to purchase goods or services over the Web, due to the lack (or widely disparate nature) of security measures deployed by Web sellers to prevent such credit or charge card fraud. Such fraud is detrimental to all involved parties, including the credit card issuers, the Web buyers and the Web sellers, who must expend time and energy processing buyer complaints. The financial loss from credit card affects both credit card issuers as well as the buyer; the major loss, however, may be experienced by the merchant who has parted with the goods and has had the charge disallowed by the credit card issuer. For the merchant, this loss is a major disadvantage in the use of credit cards for e-commerce.

However, it is not only the Web buyer's credit card information that may be stolen. Potentially far more damaging is the possibility of what may be called identity theft, the misappropriation and misuse of a person's personal and financial information. The specter of identity theft is looming ever larger, as these Web-based electronic forms provide a pre-packaged, one-stop shopping source of highly detailed confidential information to unscrupulous individuals having access thereto. Although the vast majority of Web sellers are honorable and have established procedures aimed to thwart identity theft, the sheer proliferation of Web sellers on the Internet virtually ensures that such thefts will become increasingly commonplace.

Perhaps less actionable (but just as frustrating) is the possibility of what may be termed "identity confusion". Here, one person may be confused for another and their respective personal information may be substituted or merged with one another. For example, a Web seller or credit agency may mistakenly merge two records of two identically named but separate persons. Again, this problem can only be exacerbated by the proliferation of Web sellers on the Internet, each requesting, warehousing and perhaps mining and/or selling the personal and financial information obtained from their Web buyers.

This proliferation of Web sellers also means that Web buyers are repeatedly requested to select a great many separate ID's and passwords pairs, one for each Web seller. It may become difficult, therefore, for the Web buyer to remember these ID-password pairs and/or to associate a particular ID-password pair with a particular Web seller. Some Web buyers resort to selecting a single ID-password pair and using that single ID-password pair for all of the Web sellers with whom they conduct business. This, however, is a less than satisfactory solution, as such Web buyers are more vulnerable to fraud should the single ID-password pair be misappropriated.

The perceived lack of security, simplicity and homogeneity in the data collection across Web sellers operate as barriers to entry into e-commerce, discouraging many potential buyers from purchasing goods and services on line. Web buyers, therefore, have an interest in promoting simple, homogeneous and secure Web-based transactions. What are needed, therefore, are methods and systems that allow financial transactions to be carried out on the Internet or other network in a manner that is simple, homogeneous across Web sellers and conducted in a manner that ensures the integrity and security of the Web buyers' personal and financial information.

The interests of Web sellers are generally aligned with those of their buyers, in that Web sellers have an interest in promoting simple and secure e-commerce, so as to attract the greatest possible number of buyers to their site. If an alternative to the indiscriminate collection of buyer's personal and financial information is to be implemented, Web sellers must be confident that they will be indeed paid for the goods or services they provide. What are needed, therefore, are methods and systems that will promote the interests of Web sellers and provide them with the complete assurance that they will be paid for the goods and services sold from their Web sites in a timely manner.

Curiously enough, few banks thus far have been integral parties to Web buyer—Web seller transactions. Indeed, although the money is ultimately debited from the Web buyer's bank account, or charged to his or her credit or charge card, the buyer's bank or other financial institution has not typically been actively involved in e-commerce transactions, as such transactions are conventionally structured. What are also needed, therefore, are methods and systems that include financial institutions such as banks as integral and central participants in e-commerce transactions.

Simple transactions involving a single buyer making an unconditional payment or an unconditional promise to pay a single seller, however, constitute only a fraction of the transactions that are routinely carried out. For example, many transactions involve contingent payments of some kind. Indeed, many transactions include built-in contingencies that must be met before goods or title will change hands or obligations released. Contracts for the purchase of real estate, for example, are complex transactions that typically involve the release of multiple contingencies (passing inspections, obtaining financing, carrying out improvements and other generally date-sensitive duties of both buyer and seller). Such transactions have historically been centered around holographic signatures on paper documents. Indeed, in the case of a contract for the sale of land, the buyer (and sometimes the seller) typically must repeatedly visit the escrow agent's place of business to release contingencies and/or make payments as the contingencies are met and/or released. Alternatively, a single document may be repeatedly transmitted via facsimile for signature, ultimately rendering the final document nearly illegible and potentially subject to repudiation.

Other contingent payment schemes may rely upon other insecure schemes that may also be liable to repudiation. For example, a stockbroker will accept an order to buy or sell securities or other instruments over the telephone on the presumption that the order comes from a known customer. The transaction is consummated and both documentation and payment follow by mutual agreement as "settlement", a predetermined period after the order is filled (e.g., five days). In this scenario, the customers operate based upon the assumed good faith on the broker and the broker operates on the assumed good faith of his or her customers. Such an interaction model, however, is fraught with possibilities for abuse and may expose both parties to significant liability.

Web-based brokerage, increasingly common at the present time, allows buy-sell orders over the Web on authentication of the client; this is an improvement over the phone-voice method, but no single sign-on mechanism is presently available and the Web brokerage client must select an ID and password for each broker with whom the client deals. As with other conventionally structured Web transactions, this proliferation of IDs and passwords may operate as a barrier to entry and prevent widespread acceptance of such e-commerce businesses.

Auction escrow arrangements for consumer-oriented Web auctions are conventionally handled primarily by means of credit cards. Some on-line auction Web sites require participants to supply their credit card numbers to establish authentication. Independent escrow companies typically require credit card payments, which payments are held in escrow pending release of a timed contingency or by a specific action by the purchaser. Other examples of contingent payments include inter-company payments, especially payments from one e-business to another e-business. Such payments are typically carried out with conventional paper instruments or credit cards, neither solution being truly satisfactory. Many transactions require both spouses to physically sign a paper instrument. The inconvenience of requiring each spouse to physically go to a specified location for the sole purpose of holographically signing off on (releasing) a contingency or co-signing a paper check, contract or other instrument often tacitly encourages spousal forgery. However, such forgeries may also lead to repudiation of the instrument by the bank or escrow agent, notwithstanding the most often benign nature of the spousal forger's intent. Presently, these and other contingent payments are generally handled entirely in paper format with holographic signatures. Electronic conversion of such contingency-containing transactions awaits viable methods of securely authenticating parties to contingency-containing transactions.

Such methods should provide ease of use, security and positively identity the buyer(s) and seller(s) of contingency-based payment or other contingency-containing transactions. Preferably, such methods should not resort to using credit card numbers and/or and social security numbers for identification and/or for authentication, as many consumers are understandably reluctant to broadcast such information, particularly over public networks such as the Internet. Preferably, such methods should allow remote authentication of all parties to a transaction and allow such parties to view the status of and/or release or reject any contingency (depending upon the permission level granted to that individual) within the transaction. Preferably, such methods should asynchronously notify all authenticated parties to the transaction upon completion or failure (and/or any intermediate stage(s)) of the transaction, such as when final payment has been credited to seller or when any contingency is rejected by any party to the transaction. Moreover, online mechanisms should be present to extend credit to either of the parties to the transaction should insufficient funds be present in their respective accounts.

Turning now to the business-to-business arena, payment is not usually released at the time the buyer commits to the transaction but is instead delayed, as agreed between the parties to the transaction (such as on a Net-30 day basis, for example). One reason for this is the uncertainties inherent in the underlying transaction. For example, the buyer may be concerned that the seller might not ship the goods in questions or that the goods may be unsatisfactory or otherwise nonconforming. On the other hand, shipment of the goods prior to receiving payment from the buyer leaves the seller with doubts as to whether the buyer will, in fact, pay for the shipped goods and/or whether the buyer will pay on time and as agreed. What are needed are online mechanisms to address these concerns and doubts, as well as to compensate either party upon the non-performance of the other party.

SUMMARY OF THE INVENTION

It is an object of the present invention, therefore, to provide methods and systems that allow financial transactions to be carried out on a network such as the Internet in a manner that is simple and that ensures the integrity and security of the buyer's personal and financial information, whether the buyer is an individual or a business entity. It is also an object of the present invention to provide e-commerce methods and systems that include financial institutions such as banks or other trusted parties such as governmental agencies or corporations as integral and central participants in Web-based and like transactions. A further object of the present invention is to provide methods and systems for remote and secure authentication of parties to contingency-based transactions, thereby obviating the need for obtaining holographic signatures on paper documents to release contingencies. It is a still further object of the present invention to provide an infrastructure allowing complex transactions to be securely consummated by remote participants. A still further object of the present invention is to provide online mechanisms to selectively extend credit to either of the parties to the transaction should insufficient funds be present in their respective accounts. It is another object of the present invention to provide online mechanisms to compensate either party upon the non-performance of the other party.

Accordingly, a computer-implemented method of carrying out an electronic transaction that includes a payment via a secure electronic draft, according to an embodiment of the present invention, may include the steps of establishing a secure computer site that includes a representation of the draft, the site being controlled by a trusted entity and accessible only to authenticated parties to the transaction; creating a first online letter of credit linked to a drawer of the draft and including predetermined terms, satisfaction of the terms being a precondition to the trusted entity extending credit to the drawer; authenticating each party to the draft requesting access to the draft represented at the computer site by encrypting at least a portion of an identification information provided by the requesting party over a secure channel and successfully matching the encrypted identification information with a stored encrypted (or otherwise secured by the bank or financial institution) identifier that is unique to the requesting party, and releasing payment on the draft to a drawee of the draft, at least a portion of the released payment originating from either funds of the drawer on deposit with the trusted entity or the credit extended to the drawer when funds of the drawer on deposit with the trusted entity are insufficient to cover the payment on the draft. The credit-based letter of credit in the drawer's account with the trusted entity may be the first resort for sequestration. Thereafter, any available cash in the drawer's account may be set aside. When these two sources are exhausted, the trusted entity may return an Insufficient Funds Message to the drawer.

Payment on the draft may be contingent upon removal of a contingency, and the secure computer site may be configured to provide a description of the contingency and to enable removal of the contingency. The releasing step may be carried out only when the contingency is timely removed by an authenticated party that is authorized to remove the contingency. The contingency may include a shipment of goods, a promise to ship the goods, a performance of services, a promise to perform services, a shipping date restriction, a performance date restriction and/or an inspection of the goods, for example. The trusted entity may include a bank, for example. The releasing step may include a step of sequestering funds of the drawer on deposit with the trusted entity, the sequestered funds being at least equal to a portion of the payment on the draft (if there are no letters of credit in the account equal to the purchase, for example). The first letter of credit may be revocable or irrevocable and may be effective for a single or multiple transactions. The first letter of credit may be effective for a predetermined time period. The trusted entity may further carry out a step of charging the drawer of the draft a fee for an establishment of the online letter of credit. A step of debiting the fee from the funds of the drawer on deposit with the trusted entity may also be carried out. The first letter of credit may increase a value of the drawer's funds on deposit with the trusted entity only for purposes of determining whether sufficient funds are available to release payment on the draft. A step may be carried out of granting the trusted entity a security interest in goods received exchange for the released payment. The computer site may be configured to provide the drawer of the draft with secure access to an accounting of the status of the first letter of credit. The secure computer site may also be configured to keep the existence of and access to the first letter of credit from the drawee of the draft. A step of creating a first online performance bond linked to a drawee of the draft may be carried out, the first performance bond releasing first liquidated damages to the drawer of the draft upon failure of the drawee to perform according to terms of the online transaction. The method may also include a step of sequestering the first liquidated damages from an account of the drawee until the drawee performs according to the terms of the online transaction or may be excused from performing.

A second online letter of credit linked to the drawee may be created and at least a portion of the first liquidated damages may originate from the second online letter of credit when funds available to the drawee are insufficient to release payment of the first liquidated damages to the drawer. A step of creating a second online performance bond may be created, the second online performance bond being linked to a drawer of the draft, the second online performance bond releasing second liquidated damages to the drawee of the draft in the case wherein the drawer fails to perform according to terms of the online transaction. The second liquidated damages may be sequestered from the account of the drawer until the drawer performs according to the terms of the online transaction or is excused from performing. At least a portion of the second liquidated damages may originate from the credit extended to the drawer when the funds of the drawer on deposit with the trusted entity are insufficient to cover the release of the second liquidated damages. The secure computer site may further include a representation of one or more documents defining the terms and conditions of the electronic transaction. The document(s) are preferably accessible only to authenticated parties to the transaction. Each proposed revision to the document(s) may include a revision contingency, a timely removal thereof by an authenticated party constituting approval of the proposed revision.

The present invention is also a computer-implemented method of carrying out an electronic transaction that may include a payment via a secure electronic draft, comprising the steps of establishing a secure computer site that may include a representation of the draft, the site being controlled by a trusted entity and accessible only to authenticated parties to the transaction; creating a first online performance bond, the first online performance bond defining one of first liquidated damages to be paid to a drawer of the draft upon non-performance of the drawee and second liquidated damages to be paid to a drawee of the draft upon non-performance of the drawer; authenticating each party to the draft requesting access to the draft represented at the computer site by encrypting at least a portion of an identification information provided by the requesting party over a secure channel and successfully matching the encrypted identification information with a stored encrypted identifier that may be unique to the requesting party, and carrying out one of the steps of releasing payment on the draft to a drawee of the draft when both drawer and drawee perform; paying the first liquidated damages to the drawer upon non-performance of the drawee or upon occurrence of a first event; and paying the second liquidated damages to the drawee upon non-performance of the drawer or upon occurrence of a second event.

A step of sequestering funds of the drawer on deposit with the trusted entity may be carried out, the sequestered funds being at least equal to a portion of the payment to be released on the draft. The sequestering step may sequester funds of the drawer at least equal to the second liquidated damages. A step of sequestering funds of the drawee may also be carried out, the sequestered funds being at least equal to the first liquidated damages.

The method may also comprise the steps of creating a first letter of credit linked to a drawer of the draft and including first predetermined terms, the satisfaction of the first predetermined terms being a precondition to the trusted entity extending credit to the drawer; and drawing at least a portion of the payment released to the drawee from the credit extended to the drawer when funds of the drawer on deposit with the trusted entity are insufficient to cover the payment on the draft or payment of the second liquidated damages.

The first letter of credit may increase a value of the drawer's funds on deposit with the trusted entity only for purposes of paying the second liquidated damages upon non-performance of the drawer or for purposes of determining whether sufficient funds are available to release payment on the draft. The computer site may be configured to provide the drawer of the draft with secure access to an accounting of the status of the first performance bond and of the first letter of credit. A second letter of credit may be created, linked to a drawee of the draft and including second predetermined terms, the satisfaction of the second predetermined terms being a precondition to credit being extended to the drawee and the method may further include drawing at least a portion of the payment released to the drawee from the credit extended to the drawee when funds of the drawee are insufficient to cover the payment of the first liquidated damages. The first and/or second events that trigger the payment of the first and second liquidated damages, respectively, are preferably defined in the terms and conditions of the electronic transaction.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE PREFERRED EMBODIMENTS

Functional Overview

Figure 1A:
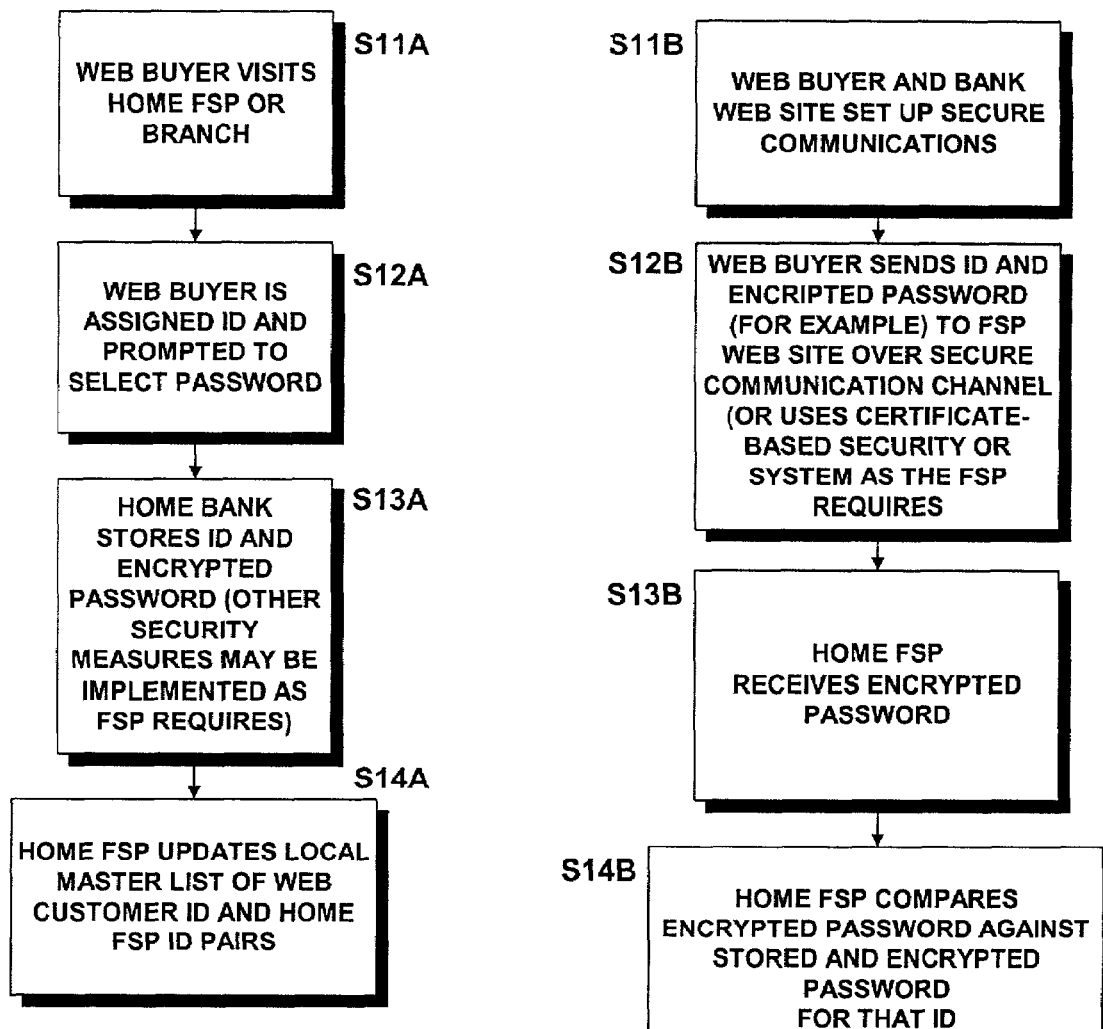
FIG. 1A is a flowchart illustrating an aspect of an embodiment of the present invention, wherein a Web buyer signs on with his or her home bank to participate in the Directory-authenticated bank draft system (the "iDraft™" system).

The present invention solves many of the problems inherent in conventional e-commerce schemes; notably the dissemination of confidential business, personal and/or financial information across unsecured networks and to diverse Web sellers, transactional security, the need to repeatedly re-enter personal information, the dangers of identity theft and identity confusion as well as the uncertainties associated with delayed payment of the goods, such as failure to ship the goods, the shipment of nonconforming goods, failure to pay, timely payment, nonpayment shipping and the like. According to the present invention, only a limited number of entities (and preferably only one such entity) hold the Web buyer's personal and/or financial information, such as bank account numbers and credit/charge card numbers. Preferably, the entity to hold such information is an entity that already enjoys a fiduciary relationship or a trusted relationship with the prospective or existing Web buyers, such as the Web Buyers' Financial Service Provider (hereafter, "FSP"), bank or banks, credit card holders, etc. In this manner, none of the Web sellers (or fewer Web sellers, in the case wherein customers knowingly and voluntarily add this information to a transaction) hold or have access to the Web buyers' personal and/or financial information, such as account numbers, credit card numbers, passwords and the like.

The present invention allows e-commerce to be carried out, if desired, without recourse to credit or charge cards while maintaining a high degree of security for the Web buyer and a high degree of reliability for the Web seller (Web sellers, within the context of the present invention, includes not only retailers offering goods and services over the Web, but also anyone person or entity utilizing the Internet, Intranet, Virtual Private Network or leased secure lines as a communication and transactional medium to conduct business and to transfer funds). Indeed, the present invention allows drafts to be executed by the Web buyer over the Internet (or some other public, private or Virtual Private Network (hereafter VPN)) and presented by the Web seller's installation of appropriate FSP-provided software to the Web buyer's financial institution for payment, in much the same manner as with checks (a specific form of a draft). However, unlike checks, the execution, presentment and payment thereof may be carried out, according to the present invention, in electronic form and without the intermediary of check clearinghouses that form an integral part of negotiating a conventional "paper" check.

Using generally accepted legal terms, a draft is a written order by a first party, called the drawer, instructing a second party, called the drawee, to pay money to a third party, called the payee. In terms of e-commerce and the present invention, the Web seller may be thought of as the payee, the Web buyer may be thought of as the drawer and the financial institution, such as the bank, may be thought of as the drawee. Herein, the terms "FSP", "financial institution" and "bank" are used interchangeably and shall be understood to include all financial services institutions accepting deposits of cash, negotiable securities, marketable shares/stock into numbered (or otherwise uniquely-identified) accounts and honoring checks, drafts and/or other customer instructions. Such a definition includes (but is not limited to) traditional banks and savings institutions, stockbrokers, online trading concerns, credit unions and any institution or trusted entity that legally identifies with and has some financial relationship with an account holder and that has the ability to honor customer or account holder instructions referring to specific accounts. The applicability of the present invention extends also to such institutions as post offices or other governmental agencies that carry out banking or quasi-banking functions, assuming that such institutions and agencies maintain numbered (or otherwise uniquely identified) accounts and require proof of identity similar to that required at banks; namely, in person signature to set up the numbered account at the institution and agreeing to the terms of service for participation in the system according to the present invention. The Internal Revenue Service (IRS) may be thought of as another example of such a governmental agency.

Since a draft may also be thought of as an unconditional promise to pay money to the order of the payee, the drawee (such as the FSP and/or other institution) has a great interest in properly authenticating (positively verifying the identity) of the drawer of the draft. Indeed, the FSP (and typically not the account holder) may be obligated to bear the loss in cases wherein an improper authentication has been made. The primary means of authenticating the drawer of a conventional paper-based draft (a check, for example) is the drawer's signature, an exemplar of which is typically stored in a card file within the FSP. Instead of a signature, an embodiment of the present invention contemplates the use of identifying information such as an identification string and password pair and/or certificates and/or biometric data or any other appropriate security system. The biometric data may include any physical characteristic that distinguishes one drawer from all others, such as fingerprints, retinal scans and/or voiceprints, for example. An illustrative embodiment of the present invention is disclosed below wherein the identification information includes the identification string and password pair, it being understood that other identification information (such as biometric data, for example) may be substituted therefor or used in conjunction therewith without departing from the scope of the present invention.

The identification string (hereafter "ID") preferably includes both alphabetical and numerical (alphanumerical) characters and uniquely identifies the draft drawer (such as a Web buyer) from other drawers. The FSP may conduct tests to ensure the uniqueness of the ID. Likewise, the password also preferably includes alphanumeric characters. The ID may, according to an embodiment of the present invention, be assigned to the Web buyer, whereas the password is preferably selected by and known only to the participating Web buyer, to the exclusion of all others, including the drawee (such as the FSP) and the payees (such as the Web sellers). For example, the ID may include or be mapped to a fully qualified domain name, as in "joesmith.smithco@myFSP.com", where "myFSP" is the second level domain of SmithCo's home FSP. To insure that the selected passwords remains known only to the Web buyer, the selected password may be immediately encrypted upon receipt thereof and stored by the FSP only in its encrypted form. This may protect the FSP from claims of misappropriation of the Web buyer's password and ID. An ID and password combination is preferably required for all individuals, whether such individuals represent themselves or a business entity. According to the present invention, actions by any party may be authenticated at least by an ID and password combination, although any means of authenticating persons that are satisfactory to the FSP may be implemented within the context of the present invention. The ID, according to the present invention, may be transmitted in the clear and is unique. Nevertheless, IDs should only be disseminated on a need-to-know basis. Moreover, IDs may be used by a FSP or cloaked by a FSP or FSP action when the FSP acts as an agent for the owner of the ID. Businesses may also create roles and privileges for its individual employees. These roles and privileges (definable limits on purchasing ability, for example) may be tied to the ID and controlled through the business' relationship with the FSP and through implementation of the present invention. Moreover, a defined chain of privilege from the business' CEO or CFO on down may prevent later repudiation. Passwords, on the other hand, are preferable known only to the individual to whom the password is associated or assigned. Alternatively, passwords of lower ranking individuals within an organization may also be known higher-ranking individuals to those to whom they report. The FSP, according to the present invention, may authenticate a user by verifying the user's ID and password combination, for example. Alternatively, any other party that is duly authorized by the FSP may authenticate a user on the FSP's behalf, by acting as an authorized agent for the FSP.

Embodiments of the present invention are explained in detail with reference to FIGS. 1A through 8. As shown in FIG. 1A, the Web buyer may initiate the method according to the present invention by visiting his or her home FSP or branch office to give signed authorization to participate in the iDraft™ system according to the present invention, as shown at step S11A. Alternatively, the Web buyer may log onto his or her home FSP Web site (or other equivalent FSP presence on a public or private network), although some FSPs may prefer or require the Web buyer to physically visit the FSP or branch to fill out the necessary paperwork and obtain an in-person holographic signature. A Web buyer's home FSP may be the Web buyer's broker or savings institution, or may be that FSP at which he or she maintains a checking account, for example. Preferably, the Web buyer and the Web buyer's home FSP, when connected over the Web, establish a secure communications channel using some agreed upon and standardized protocol, such as the Secure Socket Layer (hereafter "SSL") protocol (incorporated herein by reference) or Microsoft Corp.'s Security Support Provider Interface (SSPI), for example. SSL utilizes an encryption scheme (such as a public key encryption scheme, for example) that is negotiated at the time of the communication and helps to ensure that electronic eavesdroppers between the Web buyer and the Web buyer's home FSP cannot intercept any clear, unencrypted communication. Such an SSL may be negotiated between the Web buyer's Web browser software, for example, and the World Wide Web server of the Web buyer's home FSP. Once the Web buyer has reached his or her home FSP's Web site (or physically visited the FSP and authorized participation in the iDraft™ system according to the present invention), the Web buyer may be assigned an ID and prompted to select a password after filling out any appropriate paperwork or entering the requisite identification information in the fields supplied at the Web buyer's home FSP Web site, as outlined at step S12A. Alternatively, the Web buyer may select both ID and password, be assigned both ID and password, or any permutation thereof. According to an embodiment of the present invention, the Web buyer's browser software, under the control of the Web buyer's home FSP (or some trusted intermediary) establishes the secure channel between the Web buyer and the Web buyer's home FSP and encrypts the Web buyer's password. An example of a trusted intermediary for iDraft™-related transactions is an electronic exchange (of which Oracle Exchange—details of which are available at Oracle Corp.'s Web site—is but one example) and/or other electronic markets that may partner with iDraft™ participating FSPs or other financial institutions and that may collect and/or exchange information through iDraft™ with the FSPs.

Returning now to FIG. 1A, the Web buyer's password may briefly be in the clear (i.e., not encrypted) at the Web buyer's site only as it is being typed into the browser. However, the Web buyer's home FSP (or some trusted intermediary) may help the Web buyer secure their computer on which the browser software is running by, for example, inspecting for applets that could collect keystrokes and send them to some third party over the Internet. Preferably, the Web buyer's password is never sent to the FSP in the clear. The Web buyer's home FSP then stores the Web buyer's ID and encrypted password, as shown at S13A. The encrypted password is then stored within the Web buyer's home FSP's server or other storage device, administered by Directory software, for example. The home FSP's (e.g., Java programming language) software may use the Web Buyer's browser software to establish certificates or other security features on the Web Buyer's computer. The home FSP may also take other steps to insure that viruses or other potentially harmful agents do not affect the security of these transactions. The above-detailed steps are only exemplary of the steps that a trusted party (such as, for example, a FSP, financial institution, or other intermediary such as an exchange operating as an authorized agent for the FSP) may take to authenticate a user (or an intermediary acting as the user's agent) to its satisfaction. Indeed, the present invention is not to be construed as limiting in any way the manner in which the FSP, financial institution or other intermediary authenticates users of the system and method according to the present invention. As the FSP bears the risk of loss due to improper authentication, it is proper to allow the FSP to specify and enforce its preferred authentication method.

By only storing the Web buyer's encrypted password without storing or ever having access to the clear, non-encrypted version thereof, the Web buyer's home FSP insures that the Web buyer's unencrypted password remains known only to the Web buyer. Preferably, therefore, even the Web buyer's home FSP does not know the un-encrypted, clear password selected by the Web buyer. According to an embodiment of the present invention, only the Web buyer's home FSP (to the exclusion of all other FSPs and the Web seller) knows and/or has access to the Web buyer's encrypted password. As shown in step S14A, the home FSP, according to an embodiment of the present invention, may then update a local master list. The master list, according to an embodiment of the present invention, may include a list of Web buyers identified by their ID and an identification of the Web buyers' home FSP. Alternatively, the encrypted password may be stored with a third party, such as an Exchange or an ecommerce site. However, the third party, Exchange or ecommerce site only stores the encrypted password and only authenticates a user by comparing the password, in encrypted form, input by the user with the stored and encrypted password. The unencrypted password remains known only to the user (Web buyer, for example) and not to the third party, Exchange or ecommerce site and this knowledge is the basis of non-repudiation with respect to the underlying transaction. The authenticated user may then be passed on to the user's home FSP or other FSP.

Figure 1B:
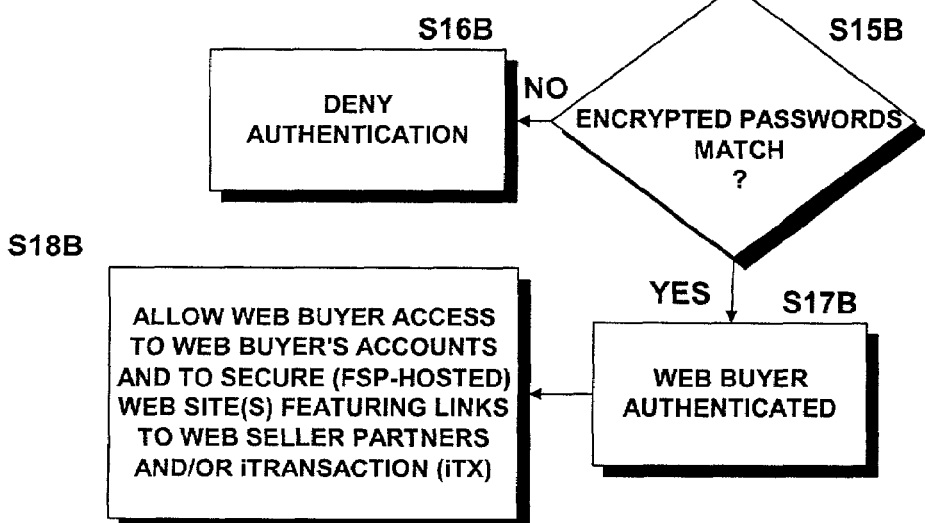
FIG. 1B is a flowchart illustrating another aspect of an embodiment of the present invention, depicting the steps taken by the Web buyer's home bank to authenticate the Web buyer to the Web seller or to allow the Web buyer to access participating Web sellers Web sites from the bank's Web site or portal.
Figure 2:
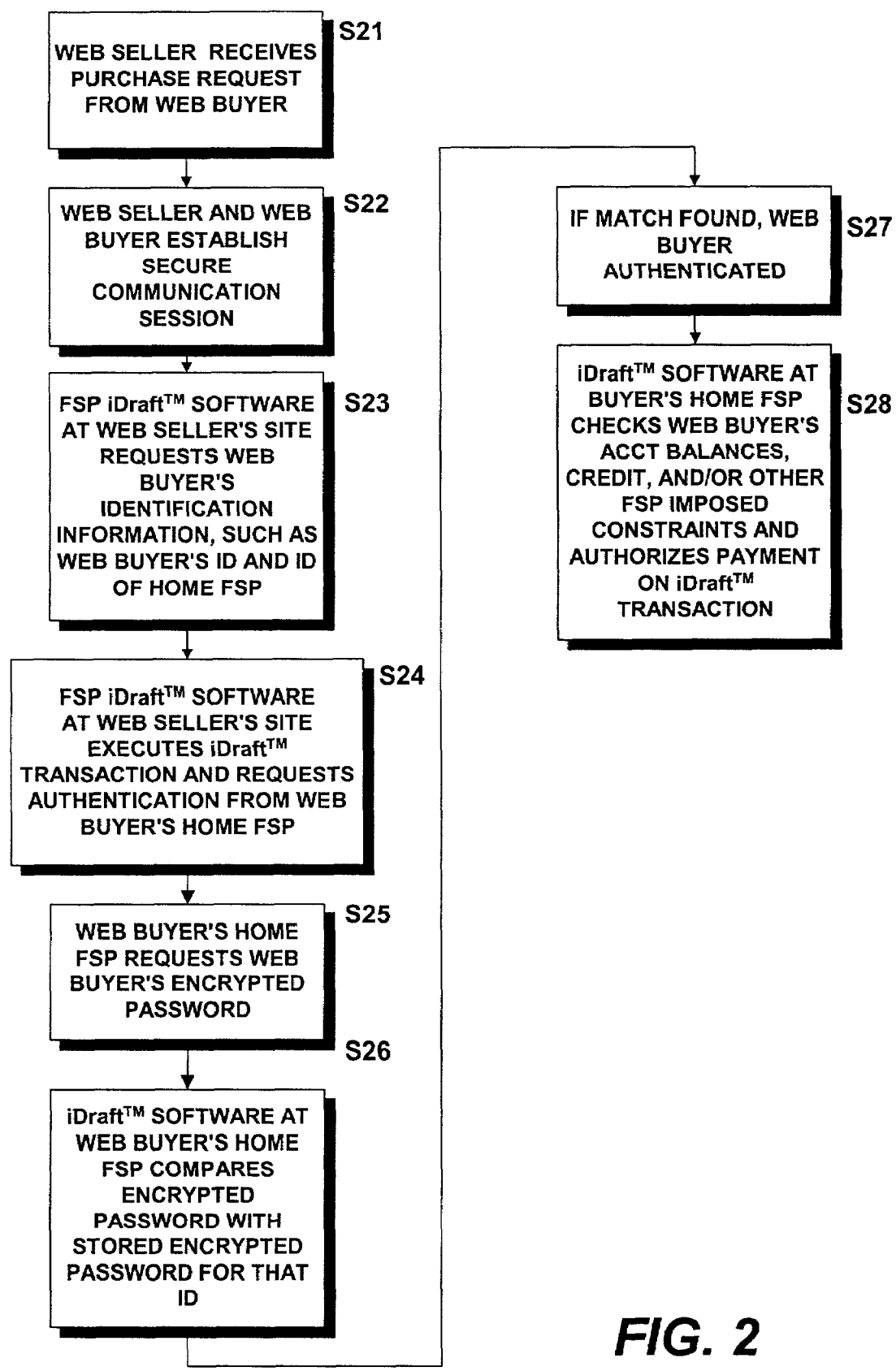
FIG. 2 is a flowchart illustrating another embodiment of the present invention.

FIG. 1B is a flowchart illustrating a further aspect of the present invention, and depicts exemplary steps that may be taken by a Web buyer's home FSP to authenticate a Web buyer wishing to purchase goods or services from a Web seller accessed through the FSP's Web site. In step S11B, a Web buyer and his or her home FSP establish secure communications, such as via an SSL (for example) negotiated between the Web buyer's Web browser software and the Web buyer's home FSP's Web server. Having accessed his or her home FSP's Web site, the Web buyer may be prompted to enter his or her ID and password (and/or other biometric data, for example), over the secure communication channel between the Web buyer's home FSP's server and the software (such as a Web browser) installed on the Web buyer's personal computer, network computer or other network- or Web-enabled device or appliance, as outlined in step S12B. The Web buyer's password is preferably encrypted (by the browser software, for example) before being sent to the Web buyer's home FSP. Alternatively, other security measures and/or means of authentication may be employed (including certificate-based measures, for example), as the FSP may require. The ID and encrypted password, transmitted over the secure communication channel, are then received by the Web buyer's home FSP's server. The Web buyer's FSP's server may then utilize the received Web buyer's ID to access the record associated with that ID. The record associated with the received ID preferably contains (or points to) the previously encrypted and stored password for that ID. The previously encrypted and stored password for that Web buyer is then retrieved. The encrypted password received from the Web buyer is compared with the previously stored encrypted password for that ID, as shown in FIG. 1B at steps S14B and S15B. If the two encrypted passwords do not match, the Web buyer is not authenticated by the Web buyer's home FSP, as shown at S16B. An appropriate message may then be generated and sent to the Web buyer prompting him or her to re-enter the ID and password, or to carry out some other action. If the two encrypted passwords match, the Web buyer is authenticated (step S17B), meaning that the Web buyer's identity has been verified to the satisfaction of the entity that bears the risk of lost; namely, the Web buyer's home FSP. The Web buyer may then, according to an embodiment of the present invention, be given access to his or her accounts at the home FSP as well as access to the home FSP's secure Web site or to secure Web sites hosted by the FSP for example. Such secure Web sites may include, for example, a payee (Web seller) list including, for example, Universal resource Locators (URLs) or some other network-relevant addresses or links to those Web sellers with whom the home FSP has a partner relationship, meaning those Web sellers that participate in (and agree to be bound by the terms of) the iDraft™ system according to the present invention, as shown at step S18B. Once authenticated, the Web buyer may remain authenticated for the length of the current session, as long as the Web buyer remains within the Web buyer's home FSP's Web site or within Web sites of Web sellers accessed through the FSP's Web site and/or with whom the FSP has established a partner relationship. Once the Web buyer leaves such Web sites, he or she is no longer authenticated and must be re-authenticated should he or she wish to have an electronic FSP draft executed and honored by his or her home FSP. Appropriate software provided by the FSP to the respective Web sellers and/or electronic market sites and/or buyers will cooperate with the Web buyers' browsers to carry out these functions and features. It is to be noted that the authentication method outlined in FIGS. 1A and 1B is but an illustrative example of how the Web buyer's home FSP may authenticate the Web buyer over a computer network, such as the Internet. However, any authentication method that verifies the identity of the Web buyer to the satisfaction of the Web buyer's home FSP (or other trusted intermediary) may be used within the context of the present invention. For example, biometrical measurements may supplement or replace the ID/encrypted password combination described above. Any other means of identifying the Web buyer with a high degree of certainty may be used within the scope of the present invention.

The secure home FSP's Web site may function as a value-added portal, meaning as a jump station or gateway from which authenticated Web buyers may transfer to selected Web seller Web sites. Such a portal, according to the present invention, may include any third party software or site with which the FSP or FSP has a contractual relationship. Within the context of the present invention, any network appropriate identifier may be substituted for the term "Web", as the present invention has broader applicability than applications relating solely to the Internet or to the World Wide Web. Having transferred to the Web site of one of the featured Web sellers, the authenticated Web buyer may purchase goods and/or services, and cause one or more FSP drafts to be executed as payment therefor. As the Web buyers accessing the Web sellers' Web sites from the home FSP's Web site are already authenticated, the Web sellers may be confident that drafts executed by such authenticated Web buyers will be, in fact, honored (paid) by the Web buyer's home FSP. Such drafts are preferably presented to the home FSP by the Web seller in electronic and encrypted form, in a manner similar to that utilized by the Web buyer in establishing secure communications with his or her home FSP, for example.

The home FSP, upon receiving and encrypting the Web buyer's password, may retrieve not only the Web buyer's (the draft drawer's) identity, but may also retrieve other financially relevant information. Such other financially relevant information may include, for example, the balance in the Web buyer's relevant accounts, his or her credit and/or predetermined spending limits. The home FSP may then establish constraints based on the retrieved financial information. For example, although the Web buyer may be properly authenticated to the FSP's satisfaction, the home FSP may not honor a draft presented to it by a Web seller, if the amount to be drawn exceeds the funds available for withdrawal in the Web buyer's relevant account(s), lines of credit, cash reserve, credit or purchase or charge cards and the like. In this manner, the home FSP will honor a draft presented by a payee with whom the drawee has a partner relationship only when the drawer of the presented draft is authenticated by drawee and when the constraints established by the drawee are satisfied. Such constraints may have been previously negotiated and agreed upon by both the FSP and the Web buyer or may be fixed by the FSP, which may condition participation in the iDraft™ system upon acceptance of such fixed constraints.

Preferably, the home FSP stores the Web Buyer's ID, encrypted password and other relevant financial and personal information in a data structure managed by Directory software, as shown in the previously-discussed step S13A of FIG. 1A. Directory software typically includes a repository (e.g., a list or database, for example) of names, permissions, resources, hardware, software and hierarchical information and/or rules within a network. The phrase "Directory software", according to the present invention, encompasses any software including or managing such a repository that is designed to operate on computers coupled to a network. For example, the home FSP may store the above-listed information in a Directory software compatible with and accessible through Directory access software, such as Directory access software compatible with the X.500 Directory Access Protocol (DAP), which protocol is incorporated herein by reference, or a subset, extension or variant thereof. One such subset of DAP is the Lightweight Directory Access Protocol or LDAP or equivalent database storage of authenticating and detailed information about a registered user. For example, the Web buyer's home FSP may implement Oracle Internet Directory™ (OID™) software (or upgrades/variants thereof), a software product developed by the assignee of the present invention. OID™ combines a native implementation of the Internet Engineering Task Force's (IETF) LDAP v3 standard (also incorporated herewith in its entirety by reference) with, for example, an Oracle8 (or later implementation) back-end data store. In like manner, the Web buyer's home FSP may store the above-detailed information within a Directory software compatible with the LDAP v3 (or later versions) protocol, such as the above-identified OID™ software from Oracle Corporation. Alternatively, other Directory software may be used for this purpose, such as Novell Directory Services™ (NDS™) of Novell, Inc.

To insure transactional security, each FSP that participates in the iDraft™ system according to the present invention maintains control over the financial information of its participating account holders, whether buyers or sellers. This keeps the account holders' financial information where it belongs: within his or her home FSP and not with the merchants he or she patronizes. In turn, each iDraft™ FSP may be responsible to an iDraft™ Association, which may be formed as an oversight and standard-setting organization to monitor the iDraft™ activities of each participating FSP and to administer the common rules that each iDraft™ FSP agrees to follow.

According to the present invention, an iDraft™ FSP (at least the Web buyer's home iDraft™ FSP and possibly also the Web seller's iDraft™ FSP) always intermediates between buyers and sellers. Indeed, no seller may authenticate a buyer, unless the seller is also an iDraft™ FSP. In that case, the buyer may also be an account holder of the iDraft™ FSP who has iDraft™ privileges. For example, the FSP may sell (via an iDraft™ transaction) printed checks, for example, to its iDraft™ buyer and account holder. All parties to an iDraft™ transaction are preferably members of the iDraft Association, either on their own account(s) or through agreements with their iDraft-member FSPs. Sellers may receive payments from an iDraft™ FSP-buyer pair through conventional means, FIG. 2 outlines another aspect of the present invention, wherein a Web buyer is authenticated after accessing a Web seller's site or an electronic market, in contradistinction to FIG. 1B, wherein the Web buyer is authenticated by first logging onto his or her home FSP's Web site and being authenticated by his or her home FSP's iDraft™ software. As shown in step S21, a Web seller receives a purchase request from a Web buyer. For example, a Web buyer may be logged on the Web seller's Web site via a personal computer or other Web-enabled device, may have selected goods for purchase and may be ready to conclude his or her purchase. Alternately, the Web buyer may just have logged onto the Web seller's site and may be requesting to be authenticated, to gain access to specially featured goods or services, or to gain access to an area in the Web seller's site that may be reserved for authenticated Web buyers, for example. The Web buyer and the Web seller may then establish a secure communication channel conforming, for example, to the SSL protocol (or some other secure and standardized protocol), as shown in step S22. According to step S23, the FSP iDraft™ software at Web seller's site (maintained and controlled—or caused to be maintained and controlled—by a participating iDraft™ FSP, such as the Web seller's home FSP, for example) may then request the Web buyer's identification information. Such identification information may include the Web buyer's ID, may include the identification of the Web buyer's home FSP (if this is the first time the Web buyer has made a purchase from this Web seller), selected biometric data and/or other security information requested by the Web buyer's home FSP. The identification information, however, does not include the Web buyer's encrypted password, as such is communicated only to the Web buyer's home FSP. There may be other passwords establishing rights of access to electronic markets and/or to other market participants. The identification information may be sent over the secure communication channel established in step S22 between the Web buyer's Web-enabled device (such as a personal computer, for example) and the Web Seller's server. As shown in step S24, the FSP iDraft™ software at Web seller's site receives the Web buyer's identification information and executes an iDraft™ transaction. Before the iDraft™ transaction is honored by the Web buyer's home FSP, however, the Web buyer must be authenticated. For that purpose, the iDraft™ software at the Web seller's site may connect the Web buyer (through his or her browser software, for example) with his or her home FSP (accessed by means of the identification thereof provided by the Web buyer), again via a secure communication channel. As shown in step S25, the iDraft™ software of the Web buyer's home FSP may request the Web buyer's encrypted password from the Web buyer. As shown in step S26, the Web buyer's home FSP may then compare the provided encrypted password with the previously stored and encrypted password corresponding to the ID provided by the Web buyer in step S23. Other means of authenticating the Web buyer may readily be implemented in place of or in addition to the ID and password combination described above.

The identification of the Web buyer's home FSP may, for example, be the stock market's symbol for the FSP, which may point to the URL of the Web buyer's home FSP's secure Web site. Moreover, the identification of the Web buyer's home FSP and the Web buyer's ID may be combined to create a unique FSP and customer ID, for example. The iDraft™ transaction to be authenticated, therefore, may include an identification of the Web buyer's home FSP, the Web buyer's ID, the amount of the purchase as well as an identification of the Web Seller. The authentication of the iDraft™ transaction may be made over a VPN between the iDraft™ software at the Web seller's site and the iDraft™ software at the Web buyer's home FSP. The parameters of the VPN may be negotiated and controlled by the respective iDraft™ software at the Web seller's site (controlled and maintained by the Web seller's iDraft™ FSP) and the iDraft™ software at the Web buyer's home FSP.

Returning now to FIG. 2, if it is determined that the two encrypted passwords match (and correspond to the proper ID), the Web buyer may be authenticated, as shown at Step S27. Again, other means of positively authenticating the Web buyer may be implemented, at the FSP's or the trusted entity's option. The Web buyer's home FSP may wish to check the now-authenticated Web buyer's current account balances or credit limits before authorizing or releasing payment on the iDraft™ transaction presented to it by the Web seller, as shown in step S28. Once payment is released, the Web buyer's account may be debited for the amount of purchase (plus any applicable iDraft™ fees from the Web buyer's home FSP and/or the Web seller's FSP) and the Web seller's account may be correspondingly credited for the amount of purchase, less any negotiated fees and/or required taxes. Alternatively, a selected payment instrument may be charged with the purchase, as arranged between the Web buyer's home FSP and the Web buyer. The Web seller, in this manner, is assured that the Web buyer's home FSP will not repudiate the draft (as it has been authorized by an authenticated Web buyer) and that payment on the draft presented to the Web buyer's home FSP will be made. If, however, the Web buyer is not authenticated or if one or more of the Web buyer home FSP's imposed constraints are not satisfied, the iDraft™ transaction presented to the Web buyer's home FSP fails. A failure notification (which may itself be encrypted) may be generated to all relevant parties to confirm the failure of the transaction. iDraft™ fees may be assessed by either of the Web buyer's home FSP or the Web Seller's FSP, notwithstanding the failure of the underlying transaction. iDraft™ fees may also be assessed by either or both of the FSPs associated in a successful transaction.

The Web buyer is preferably authenticated by his or her home FSP for one session only: the Web buyer will preferably need to be authenticated again the next time he or she logs on to the Web seller's Web site. However, the Web buyer need not necessarily re-enter the identification of his or her home FSP the next time he or she purchases an item from that Web Seller. Indeed, the Web seller may store the Web buyer's ID and the identification of the Web buyer's home FSP in a master file maintained locally, such as within the Web seller's server. In this manner, the next time the Web buyer visits the Web seller's Web site, the Web seller will know which FSP is the Web buyer's home FSP and may contact that FSP automatically for authentication of a further iDraft™ transaction for the Web buyer's next purchase, assuming the Web buyer has not changed his or her home FSP.

The security of the Web buyer's personal and/or financial information, as well as the security of the transaction between the Web buyer and Web seller itself, is assured at several levels. Indeed, all communications involving the transfer of identification information and data, such as biometric data and/or IDs, passwords and the like, are preferably carried out over secure communications channels and encrypted. Moreover, the encryption scheme used to encrypt the Web buyer's password at the Web buyer's home FSP is known only to the Web buyer's home FSP's Directory software and not to the FSP itself, the Web seller or the Web buyer. According to the present invention, no Web seller stores or has access to more (unencrypted) information from the Web buyer than the Web buyer's ID and an identification of the Web buyer's home FSP, unless the Web buyer voluntarily offers such to the Web seller. This is in contradistinction to the current prevailing practice of routine collection of names, addresses, telephone numbers and credit card information. This sensitive information, according to the present invention, is maintained by the entity that already has access thereto and control there over: the Web buyer's home FSP. Dissemination of the Web buyer's personal and financial information is, therefore, limited to an entirely benign Web buyer ID and identification of the Web buyer's home FSP. In addition, once the Web buyer has been authenticated by the home FSP and the home FSP has authorized payment of the draft (has honored the draft or has agreed to honor the draft), the Web seller is assured that he or she will, in fact, be paid for the amount of the Web buyer's on-line purchase(s). This assurance may take the form of an email sent to the Web seller by the Web buyer's home FSP through the VPN established between the iDraft™ software at the Web seller's site and the iDraft™ software at the buyer's home FSP, the email stating that the Web seller will be paid, subject to any previously agreed upon terms and conditions. The financial institution, such as the Web buyer's home FSP, therefore, assumes a greater role in e-commerce as the only holder and controller of the Web buyer's financial information and as the guarantor of the security and integrity of e-commerce transactions between the Web buyer and the Web sellers whose FSPs belong to the iDraft™ Association or other similar standard setting and overseeing organization that ensures compliance with previously agreed upon common rules for implementation of the present invention.

The transactions between the interested parties, such as the Web buyer, the Web seller and the home FSP are carried out at great speed, even without the benefit of high-speed connections between the respective parties. Indeed, the amount of information exchanged during any particular exchange may be on the order of a few hundred bytes, as only a small amount of information is actually transferred between the Web buyer, the Web seller's Directory software and the home FSP's Directory software. Indeed, an encrypted message containing the Web buyer's ID and password need only use about 100 bytes or less. The communications between the Web seller and the Web buyer's home FSP may be similarly brief. In any event, FSPs are generally well suited to handle the small-added communications bandwidth necessitated by the present invention, as FSPs typically maintain high-speed communication networks to handle existing electronic transactions. As the amount of information to be exchanged during a typical transaction according to the present invention is very small, the Internet is well suited to act as the medium over which the parties communicate. Indeed, even at dial up speeds (on the order of a few tens of kilobits per second at the time of this writing), the Web buyer can be very rapidly authenticated and receive confirmation for his or her purchase from the Web seller (and thus from the Web buyer's home FSP) in a sufficiently short period of time to foster a wide acceptance of the present invention, both at the Web buyer and the Web seller's level.

Figure 3:
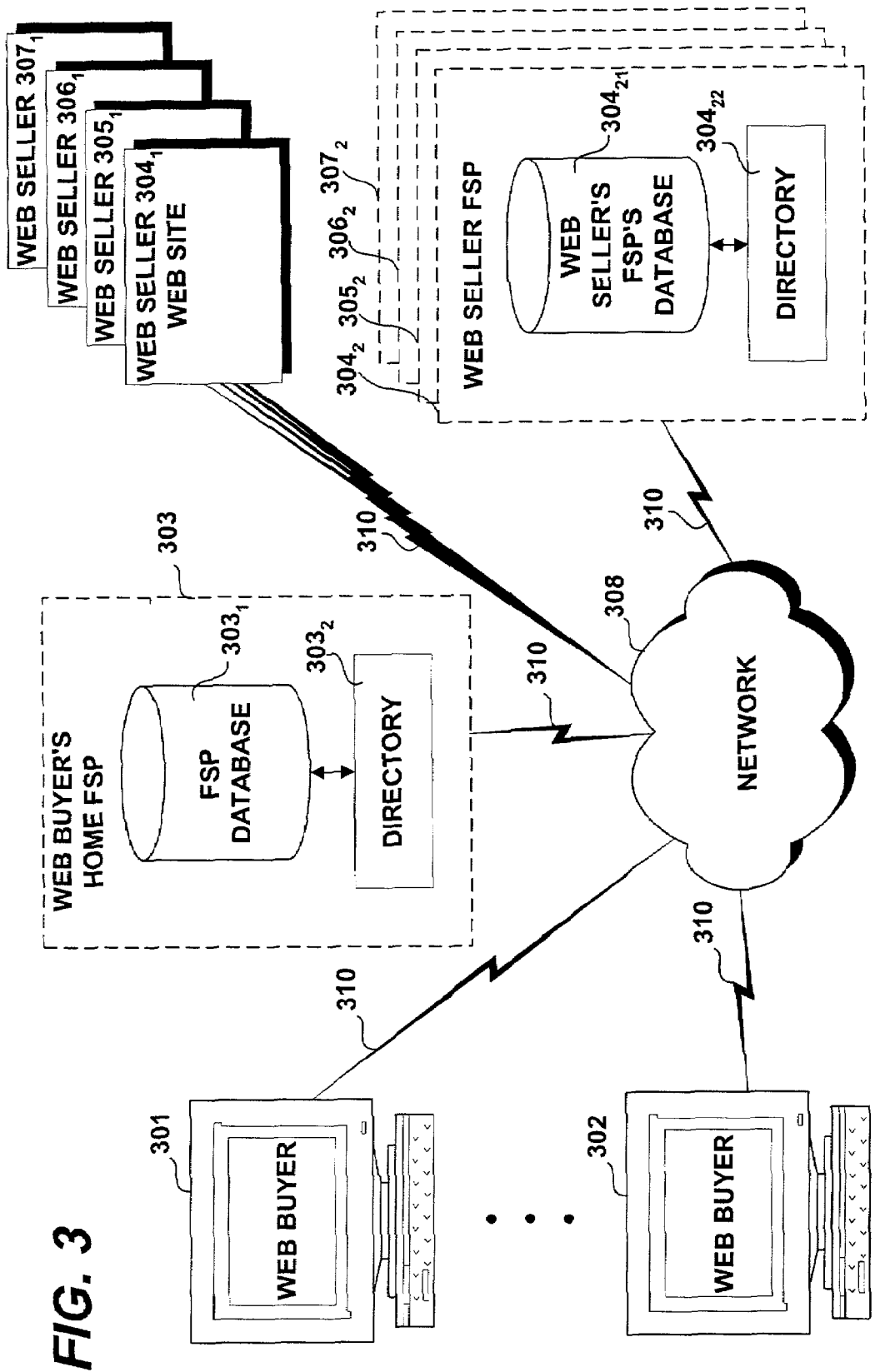
FIG. 3 shows a system or a network of computing devices adapted to carry out embodiments of the present invention, each of the computing devices being coupled to a network (such as the Internet, for example).

FIG. 3 shows a system of computing devices 301, 302, 303, $304_2$, $305_2$, $306_2$, and $307_2$ adapted to carry out embodiments of the present invention, each of the computing devices 301, 302, 303, $304_2$, $305_2$, $306_2$, and $307_2$ being coupled to a network 308. Each of the computing devices 301-307 may have a structure similar to that outlined in FIG. 8, for example. The Web buyers, according to the present invention, may utilize personal computers, workstations, Web-based appliances or any other means of accessing the network 308 through one or more of a variety of network access channels 310. Such means are generically shown at reference numerals 301 and 302. Network access channels 310 may include telephone lines, leased lines, wireless channels and the like. The network 308 may include any type of network, whether public, private or a hybrid of public and private networks. For example, the network 308 may include the Internet. The Web buyer's home FSP's server, shown at reference 303, is also connected to the network 308 and includes a database $303_1$ managed by Directory software $303_2$. Each of the Web sellers participating in the iDraft™ system according to the present invention maintains a Web site $307_1$, $306_1$, $305_1$ and $304_1$ that is accessible to the Web buyers 301, 302 through the network 308. Each of the Web sellers, in turn, is coupled to its respective home FSP $307_2$, $306_2$, $305_2$ and $304_2$, again, via the network 308. Each of the Web sellers' home FSPs $307_2$, $306_2$, $305_2$ and $304_2$ maintains a database containing the Web Seller's ID, encrypted password, financial information and the like, which database is controlled by Directory software. For simplicity of illustration, only the database $304_{21}$ and the Directory software $304_{22}$ of the Web seller $304_1$ is shown in FIG. 3. In the case wherein Web buyer 301 and a Web seller $304_1$, for example, share the same home FSP $304_2$, the Web buyer's home FSP 303 may be omitted, all transactions occurring within the FSP $304_2$. That is, the Directory software at Web seller $304_1$ causes an LDAP-formatted (for example) query to be sent to the Web seller's (and Web buyer's) home FSP $304_2$, which query contains the ID of the Web buyer 101 and an identification of the Web buyer 301's home FSP (in this case, the Web seller's home FSP $304_2$), as inputted by Web buyer 301. The FSP $304_2$ may then request the password of the Web buyer 301, encrypt it and consult its database $304_{21}$ to match the Web buyer 301's ID and encrypted password with the stored and encrypted password corresponding to that ID. If a match is found, the Web buyer 301 is authenticated for this transaction only. The Web seller 304, and the Web buyer 301's home FSP $304_2$ may, thereafter, check the Web buyer 301's accounts to determine whether Web buyer 301 has sufficient funds on deposit to cover the amount of purchase of the iDraft™ transaction and any iDraft™ transaction fees associated therewith. If so, the electronic draft presented by the Web Seller $304_1$ to the Web seller's home FSP $304_2$ for the Web buyer 301 's purchases will be honored by the parties' common home FSP $304_2$. That is, a notification may be dispatched to the Web seller $304_1$ and/or to the Web buyer 301, the notification indicating that the FSP $304_2$ will in fact honor the draft. The Web seller $304_1$, thereafter may release the goods or perform the services in question with complete assurance that it will be paid therefor.

However, often the Web seller $304_1$ and the Web buyer 301 do not share the same home FSP. The Web buyer's home FSP 303 and the Web seller's home FSP $304_2$ are now assumed to be separate entities. Upon visiting the Web seller's Web site $304_1$, the Web buyer 301 will cause the Web seller $304_1$ to execute an iDraft™ transaction as payment for the goods and/or services selected. According to an embodiment of the present invention, the Web seller's Web site $304_1$ will then request authentication of the Web buyer 301 by requesting the Web buyer's ID and the identification of the Web buyer 301's home FSP 303. The Web seller 304₁'s Directory software, administered and controlled by its home FSP 304₂ will then forward the supplied information to the home FSP identified by the Web buyer 301. Alternatively, the information supplied by the Web buyer 301 (ID and identification of home FSP 303) may be transmitted to the Web seller 304₁'s home FSP 304₂, which FSP 304₂ forwards the supplied information to the Web buyer 301's home FSP 303 for authentication. In any event, the Web buyer 301's home FSP 303 then requests the Web buyer 301's password over a secure communication channel. The Web buyer 301's home FSP 303 then encrypts the provided password and consults its database 303₁ to match the Web buyer 301's ID and encrypted password with the stored and encrypted password for that ID. If a match is found, the Web buyer 301 is authenticated for this transaction only. The Web buyer 301's home FSP 304₂ may thereafter check the Web buyer 301's accounts to determine whether Web buyer 301 has sufficient funds on deposit or available credit to cover the amount of purchase and any iDraft™ transaction fees associated therewith. If so, the electronic draft presented by the Web Seller 304₁ to the Web buyer 301's home FSP 303 for the Web buyer 301's purchases will be honored by the Web buyer 301's home FSP 303. Payment on the draft may be immediate and/or a notification may be dispatched to the Web seller 304₁ and/or to the Web buyer 301, the notification indicating that the Web buyer 301's home FSP 303 will in fact honor the draft. The Web seller 304₁, thereafter may release the goods or perform the services in question with complete assurance that it will be paid therefor.

Many transactions, however, are not structured around a single buyer buying goods or services from a single seller in a single, isolated and independent transaction. Complex transactions often include staged performances and staged payments, payments contingent upon some action on the part of the buyer and/or seller or time restrictions on acceptance and performance. For example, according to the present invention, one set of contingencies may be associated with each line item of an invoice and referenced to a corresponding line on a purchase order. This allows partial shipment of goods and consequent partial payment. Such transactions may not be easily fitted into the simple transactional model detailed with reference to FIGS. 1*a*, 1*b*, 2 and 3. Such transactions, to be carried out securely over a public network such as the Internet, require an e-commerce infrastructure able to support such added complexities as contingencies (whether involving payments or not), staged performances and part payments.

The present invention supports such complex transactions by employing an infrastructure that may be termed an iTransaction (hereafter "iTX"). An iTX, according to an embodiment of the present invention, may include a number of iDraft™ transactions as described above and/or one or more contingent iDraft™ transactions (hereafter "iDraftC™"), described herein below. The constituent iDraft™ and/or iDraftC™ transactions of an iTX according to the present invention may be interdependent or may be wholly independent of one another. The iTX includes a framework that insures that each of its constituent iDraft™ and/or iDraftC™ transactions succeeds and reports success or failure of the iTX to all parties to the iTX. A successful iDraft™ transaction, according to an embodiment of the present invention, may be defined as an electronic draft negotiated between two or more authenticated parties on which payment has been made. An iDraftC™ transaction, according to an embodiment of the present invention, may be defined as an iDraft™ transaction, the release of payment on which is predicated upon the removal (or, synonymously, satisfaction) of one or more associated contingencies. Removing a contingency, according to exemplary embodiments of the present invention, may include carrying out (or promising to carry out) some necessary action, the successful completion of one or more iDraft™ transactions or waiving some action or obligation, for example. Therefore, a successful iDraftC™ transaction, according to an embodiment of the present invention, may be defined as an iDraft™ transaction in which all associated contingencies have been satisfied (removed) and in which all constituent iDraft™ transactions have been honored (e.g., paid) or denied within the agreed upon terms and conditions represented by the iDraftC™ construct. For example, the charges incurred in preparation of a termite report are paid even though the underlying real estate transaction has failed.

Figure 4:
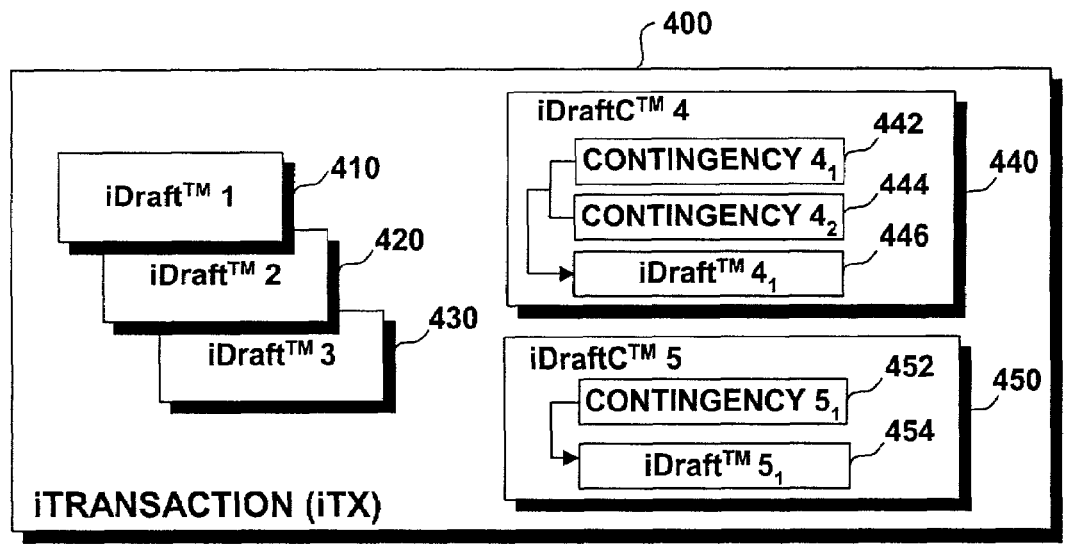
FIG. 4 is a block diagram of the logical structure of an exemplary iTransaction (iTX)

The logical structure of the iTX, an example of which is shown in FIG. 4, may mirror the architecture of the underlying transaction to be carried out. That is, the iTX may list each of a series of related payments (each to be made using an iDraft™ transaction, for example) and/or one or more contingent payments (each made using an iDraftC™ transaction upon removing one or more associated contingencies). The series of iDraft™ and/or iDraftC™ transactions may be carried out remotely over a network such as the Internet, using the authentication procedures detailed above relative to iDraft™ transactions. Such transactions, therefore, may be carried securely and remotely from common secure Web browser software (or any other appropriate and secure communications software) from any Web-capable device having the capability of accepting and transmitting users' identification (biometric data and/or ID and password pairs, for example) over the network to another computer. In this manner, transactional security is assured without resorting to physical or digital holographic signatures and without resorting to a near indiscriminate dissemination of sensitive personal information (such as credit card numbers, for example) over public networks to a myriad of Web sellers.

As shown in FIG. 4, an iTX 400 according to an embodiment of the present invention, may include a number of iDraft™ transactions, such as shown at references 410, 420 and 430. Each of these iDraft™ transactions may correspond, for example, to a payment that a specified first party (a buyer, for example) must make to a specified second party (such as a seller, for example). Alternatively, each iDraft™ transaction may involve multiple parties at each end of the transaction. Each of the iDraft™ transactions 410, 420 and 430 may involve the same, some of the same or wholly different parties. Each of these parties to the iTX (and by extension, each of the parties to the constituent iDraft™ and iDraftC™ transactions), however, must be authenticated in the manner detailed with respect to FIGS. 1*a*, 1*b*, 2 and 3 for payment(s) on the drafts to be released. In turn, authentication entails that each party to the iTX 400 belong to a participating iDraft™ institution, such as his or her home FSP. In the example illustrated in FIG. 4, iDraft™ transaction 1, referenced by numeral 410, may represent a draft for the down payment on a property, which down payment must be paid for the iTX 400 (representing a complete residential real estate transaction, for example) to succeed. iDraft™ transactions 2 and 3 (reference numerals 420 and 430, respectively) may represent drafts for payment of other taxes or services which each must be paid for the entire residential real estate transaction represented by the iTX transaction 400 to succeed, i.e., for the sale to be consummated.

The iTX transaction 400, as shown in FIG. 4, may also include one or more contingent payment iDraft™ transactions, referenced by iDraftC™ 4 440 and iDraftC™ 5 450. Each of the iDraftC™ transactions 440, 450 may include one or more contingencies that must be satisfied (i.e., removed) for payments to be made on the underlying respective iDraft™ transactions. In the illustrative example of FIG. 4, the iDraftC™ 4 440 transaction includes two contingencies; namely contingency $4_1$ 442 and contingency $4_2$ 444, whereas the iDraftC™ 5 450 transaction includes a single contingency $5_1$ 452. In the iDraftC™ 4 440 transaction, both contingencies 442 and 444 must be satisfied (i.e., removed) for payment on the iDraft™ $4_1$ to occur. In keeping with the real estate transaction example, contingency $4_1$ may be related to a structural inspection of the home, whereas contingency $4_2$ may be related to an inspection of the electrical system thereof, for example. According to the structure of the iDraftC™ transaction 440, both the structure and electrical system of the home must pass inspection for payment to be made on the iDraft $4_1$ 446 to, for example, the general contractor. Thus, according to this example, both the structural and electrical inspectors would be designated as parties or contingency removers to the iTX 400 (and specifically to the iDraftC™ 4 440) and would each need to be authenticated in the manner described above. Assuming the structure and electrical systems pass inspection, the structural and electrical systems inspectors would log onto, for example, the Web site administered by the escrow agent or other trusted party (such as the buyer's or seller's FSP, for example), become authenticated by their respective home FSPs in the manner described above and be presented with the option to remove the appropriate contingency or contingencies by checking an appropriate box with the click of a mouse or other input device, for example. In a similar manner, the contingency $5_1$ may represent the completion and inspection of a swimming pool and the iDraft $5_1$ transaction may represent payment to the pool contractor.

Should the structural inspection reveal serious defects, for example, the sale of the residential real estate would not be consummated and the buyer and seller would not exchange payment for the underlying property. iTX transactions according to the present invention support such real-world constraints by tying the success of the deal (the sale of the residential real estate in the current example) to the payment of each of the constituent iDraft™ and iDraftC™ transactions, and to the satisfaction (e.g., removal) of each listed contingency, whether or not associated with an iDraft™ transaction. In the case wherein the structural inspection fails, the contingency remover (in this case the structural inspector) would not exercise the option to remove the structural inspection contingency and the iTX representing the overall residential real estate transaction would fail. In the case of iTX 400, each of the iDraft™ transactions 410, 420 and 430 and each of the iDraftC™ transactions 440 and 450 must be successful (all listed contingencies removed and payment(s) made) for the iTX 400 itself to be successful. Some fees and/or charges may, by advance agreement, be paid by the buyer or seller in an iTX transaction.

Figure 5:
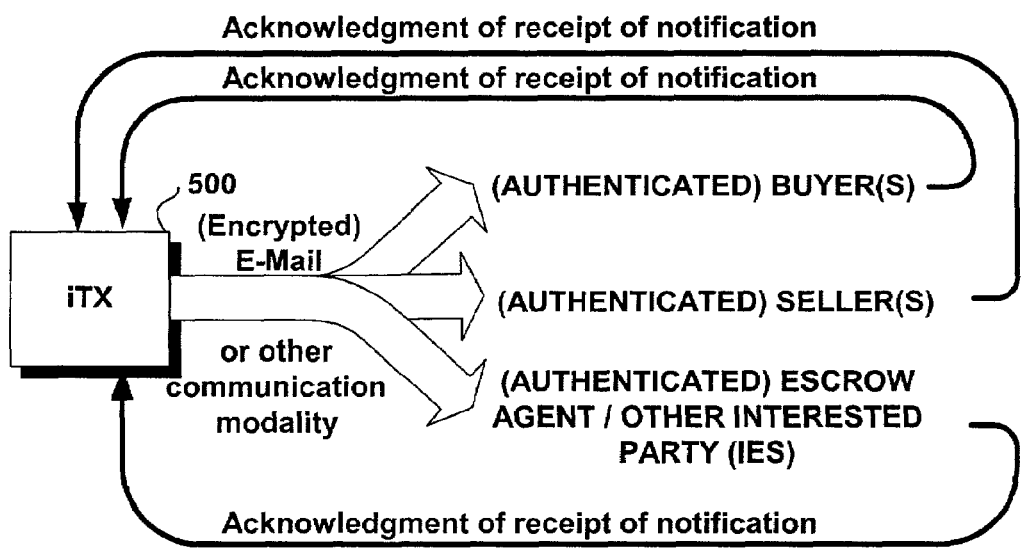
FIG. 5 is an illustration of an iTX sending notifications to all interested parties to the iTX.

When a party to a transaction causes an iTX transaction to be created, such as shown at reference 500 in FIG. 5, the iDraft™ software according to the present invention causes each party (and/or each contingency remover, as appropriate) to the transaction to be notified of his or her requested participation in the iTX. According to an embodiment of the present invention, such notification may be carried out via email, for example. The parties to the iTX transaction 500 may be notified of their requested participation via modalities other than email, and all such other notification modalities are to be included within the scope of the present invention. As shown in FIG. 5, the iTX 500 notifies (sends an email requesting the participation of) at least the buyer or buyers of the property or properties (or service or services) involved in the underlying iTX transaction 500, the seller or sellers of the underlying property or properties, a trusted party such as an escrow agent(s) and/or any other interested (e.g., necessary) party or parties to the transaction. The notifications may be encrypted, especially when the FSP administering the iTX transaction 500 functions as an Internet Service Provider (ISP). The trusted party may be a financial institution (such as the buyer's home FSP, for example), a corporate entity with fiduciary characteristics and established accounts (such as the seller's real estate agency, for example) or some other public or governmental institution (such as the post office, for example). The interested party may be, as noted above, an Exchange or ecommerce site, for example. Another example of an interested party is that of a contingency approver. In the example of the residential real estate transaction, a contingency approver may be the structural inspector who, although neither a buyer nor a seller of the involved property underlying the transaction, is nevertheless a necessary party thereto.

Upon being notified of their requested participation in the iTX transaction 500, each notified party (including contingency approver) preferably must take steps to be authenticated by the iDraft™ system. Authentication may be valid only for a session of a limited duration. To become authenticated, each notified party may initially carry out steps S11a, S12a and S13a shown in FIG. 1a, wherein the phrase "notified party" may be substituted for the phrase "Web buyer" and the selected trusted party may be substituted for the phrase "home FSP or branch". If the notified party already has iDraft™ privileges (has previously carried out steps S11A-S14A of FIG. 1A) then he or she need not repeat these steps again and may become authenticated remotely as detailed above via a Web browser, for example. According to the present invention, the trusted party (most often the party's home FSP) determines the levels of documented identification necessary to support authentication of the notified party to the iTX transaction 500. The visit to the trusted party may be carried out physically (in person) or may be carried out by visiting the trusted party's Web site and providing evidence of identity, to the satisfaction of the trusted party. Each of the notified parties to the iTX transaction 500, therefore, may receive a unique ID and may select or be assigned a password, in the manner described above. Alternatively, biometric data or FSP-controlled certificates may supplant or supplement the ID-password combination. Indeed, additional advanced security measure (such as the use of certificates, for example) may be required in the buyer-seller-FSP relationship when, for example, large sums of money are transferred via iDraft™ or iDraftC™ transactions or any other instance wherein the FSP requires added measures of security. Such certificates may then be one-time, transaction-specific certificates authorizing the transaction or may be multiple time certificates applied in special circumstances to determine the limits of the transactions. External certificates may unduly burden the free flow of normal e-commerce and their use, preferably, should be relegated to special circumstances. The external certificate (and/or other security measures agreed upon between the iDraft™ FSP—or other trusted party as defined above—and the customer), when used, should be provided by the iDraft™ FSP to the customer and must be implemented in addition to the authentication of the customer according to the present invention, and not as a substitution therefor.

According to an embodiment of the present invention, should any of the constituent iDraft™ or iDraftC™ transactions of the iTX transaction 500 (such as the iDraft™ transactions 410, 420, 430 or any of the iDraftC™ transactions 440, 450 of FIG. 5) fail, the iTX 500 itself fails with notice to all parties to the transaction. The iDraft™ transactions representing FSP fees, technology owner fees, iDraft™ Association fees and other transactional fees may succeed, even through the underlying iTX500 may have failed. Referring back to FIG. 4, such a failure may be caused by non-payment on any of the constituent iDraft™ 410, 420, 430 or iDraftC™ 440, 450 transactions of the iTX 400 or, for example, by an authenticated party or contingency approver rejecting (failing or refusing to exercise the provided option to remove) any of the (time-based, for example) contingencies of the constituent iDraftC™ transactions. The failure notice notifies all parties that the iTX transaction (and thus the underlying deal) has failed. Partial payments, released in response to the presentation of one or more constituent iDraft™ 410, 420, 430 or iDraftC™ 440, 450 transactions may then be retained or fully or partially refunded, as appropriate under the circumstances or as previously agreed between the parties to the transaction and the trusted party. The trusted party may retain a portion of the payments released in lieu of transactional fees. Moreover, some parties may still be paid via an iDraft™ transaction (such as property inspectors, for example), even though the iTX has failed.

The FSP or other appropriate fiduciary institution may establish appropriate constraints based upon the buyer's agreement with the FSP (such as the terms of the loan extended to the buyer) and/or the buyer's retrieved financial information (availability of funds and/or credit limit, for example). Thus, a trusted party such as a FSP may limit the magnitude of any payment to be made on an iDraft™ (an otherwise unconditional payment or promise to pay) or iDraftC™ transaction.

Figure 6:
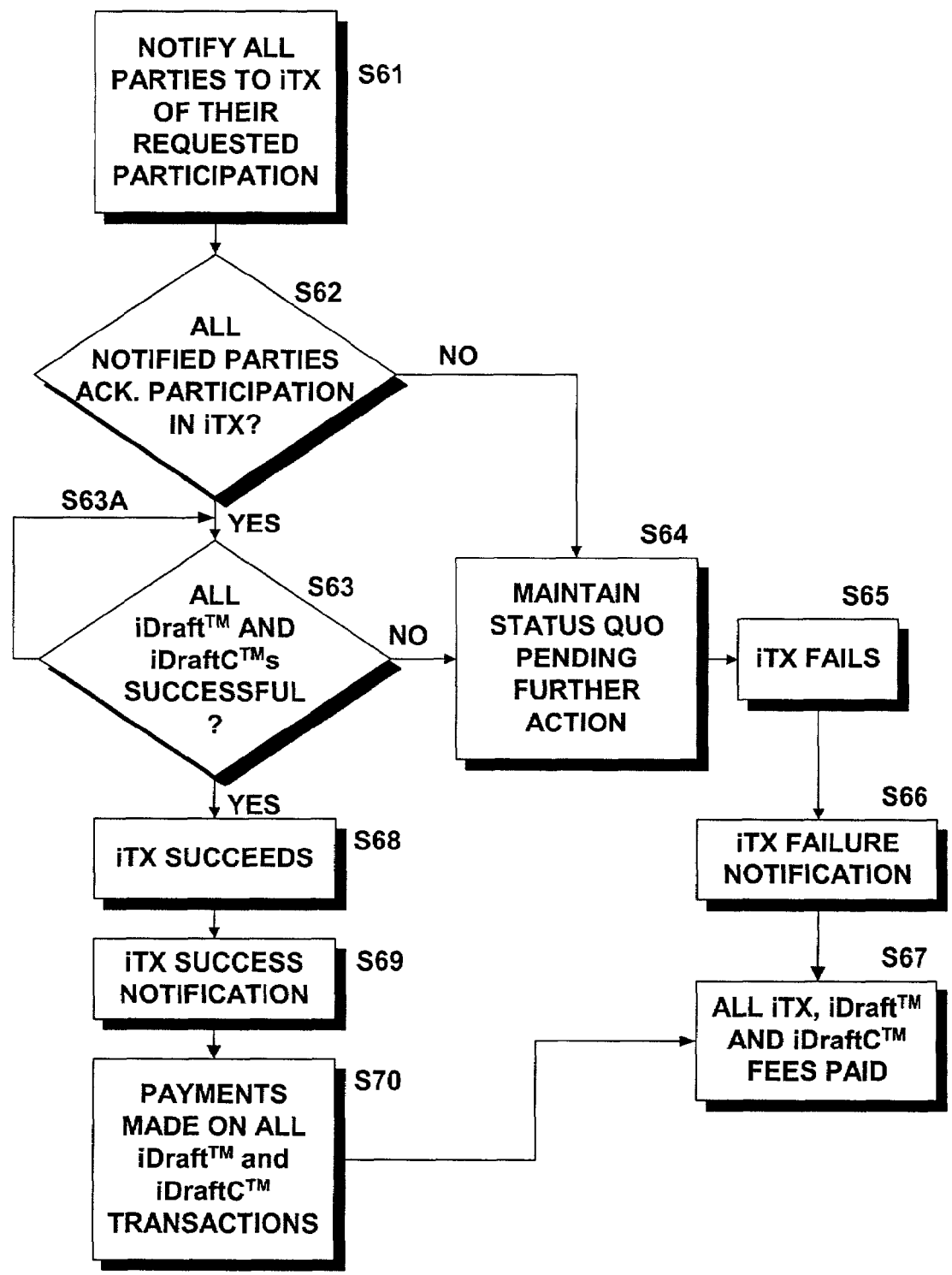
FIG. 6 shows a flowchart of the execution flow of an iTX transaction, according to an embodiment of the present invention.

FIG. 6 shows a flowchart of the execution flow of an iTX transaction, according to an embodiment of the present invention. As shown therein, step S61 notifies all parties to the iTX transaction of their requested participation therein. According to an embodiment of the present invention, the notification may be carried out by secure (i.e., encrypted) email over a VPN on the Internet. The parties to an iTX transaction may include, for example, the buyer(s)/seller(s), the payor(s)/payee(s), the contingency approver(s), the trusted party (e.g., FSP(s) and/or other escrow agent(s)). According to an embodiment of the present invention, each party to an iTX transaction may remotely (using a Web browser, for example) inspect (i.e., view) all of the constituent iTX transaction or the selected portion or portions thereof that concerns them (depending upon the permission levels granted to each party upon the creation of the iTX transaction and/or during the authentication procedure) and monitor the progress of the overall iTX transaction by determining which iDraft(s)™ and/or iDraftC™ transactions are still pending, if any. A pending iDraft™ or iDraftC™ transaction, according to the present invention, may be thought of as a transaction on which payment has not been released by the drawee of the underlying draft. To inspect an iTX transaction, one must be a party thereto or a contingency approver thereof (e.g., have received a notification requesting participation therein), and have become authenticated in the manner detailed relative to FIG. 1b, for example. The iTX transaction is then presented by the FSP's software (in the case wherein the iTX transaction is maintained or hosted by the FSP) and authenticated parties may, depending upon the level of privilege granted to them during the authentication procedure, approve and/or disapprove any of the contingencies of any of the iDraftC™ transactions appropriate to that party, or take no action at all. It is to be noted that an authenticated party may be authenticated only for a limited purpose, such as approving or disapproving a specific contingency, for example. In the example above, the structural inspector may be authenticated only for the limited purpose of approving/disapproving the contingency related to the structural inspection of the home and not for any other purpose. Such a limited authentication may also limit the extent of the textual or graphical representation of the iTX transaction that is visible to the authenticated party or contingency approver as he or she logs onto the Web site hosting the iTX transaction.

Returning now to FIG. 6, step S62 determines whether all notified parties to the iTX transaction have acknowledged receipt of the notification (shown in FIG. 5), have become authenticated and have indicated their willingness to participate in the iTX transaction and the underlying deal. Upon failure of the iTX transaction, as would occur if fewer than all notified participants acknowledge receipt of the notification (NO branch of S62 or when all iDraft™ transactions and iDraftC™ transactions were not successful, as indicated by the NO branch of S63), the underlying transaction may be frozen in its current state pending further action, as shown in step S64. In such as case, none of the iDraft™ or iDraftC™ transactions may be carried out and none of the options to remove any of the contingencies (if the involved iTX includes such) may be exercised. Upon failure of the iTX, as shown in step S65, a failure notification is sent to all previously notified parties, as shown in step S66. As shown in step S67, the iTX, iDraft™ and/or iDraftC™ transaction fees, if any, may nevertheless be paid to the participating iDraft™ FSPs and/or iDraft™ Association, notwithstanding the failure of the involved iTX transaction. If, however, all notified parties to the iTX transaction acknowledge receipt of their respective notification in step S62, become authenticated and indicate their willingness to participate in the iTX transaction, the method according to the present invention proceeds to step S63. In step S63, it is determined whether all of the constituent iDraft™ and/or iDraftC transactions of the iTX transaction have succeeded; i.e., whether all required payments have been released on all constituent iDraft™ and iDraftC™ transactions within the designated time limit for completion of the iTX (if such time limit exists) and whether all contingencies that do not involve a payment (if any) have been released. The method according to the present invention may remain at step S63 until the expiration of such time limit, as shown by arrow S63A. Payment on each iDraftC™ transaction entails that each contingency of each such iDraftC™ transaction has been released or satisfied. If it is determined in step S63 that all constituent iDraft™ and iDraftC™ transactions of the iTX transaction have indeed been successful, then the iTX transaction itself is deemed a success, which entails that the underlying physical deal or transaction on which the iTX transaction is modeled was itself successfully consummated or carried out to completion (or that all antecedent steps necessary for successful completion of the transaction have been carried out). Upon success of the iTX transaction in step S68, each party to the transaction is so notified, as noted in step S69 and all payments on all iDraft™, iDraftC™ and iTX transactions are released, as shown in step S70. Payments may then also be made for all appropriate iTX, iDraft™ and iDraftC™ fees, as shown in step S67. Such fees may take the form of an iDraft™ transaction between the FSP as both drawer and drawee.

Figure 7:
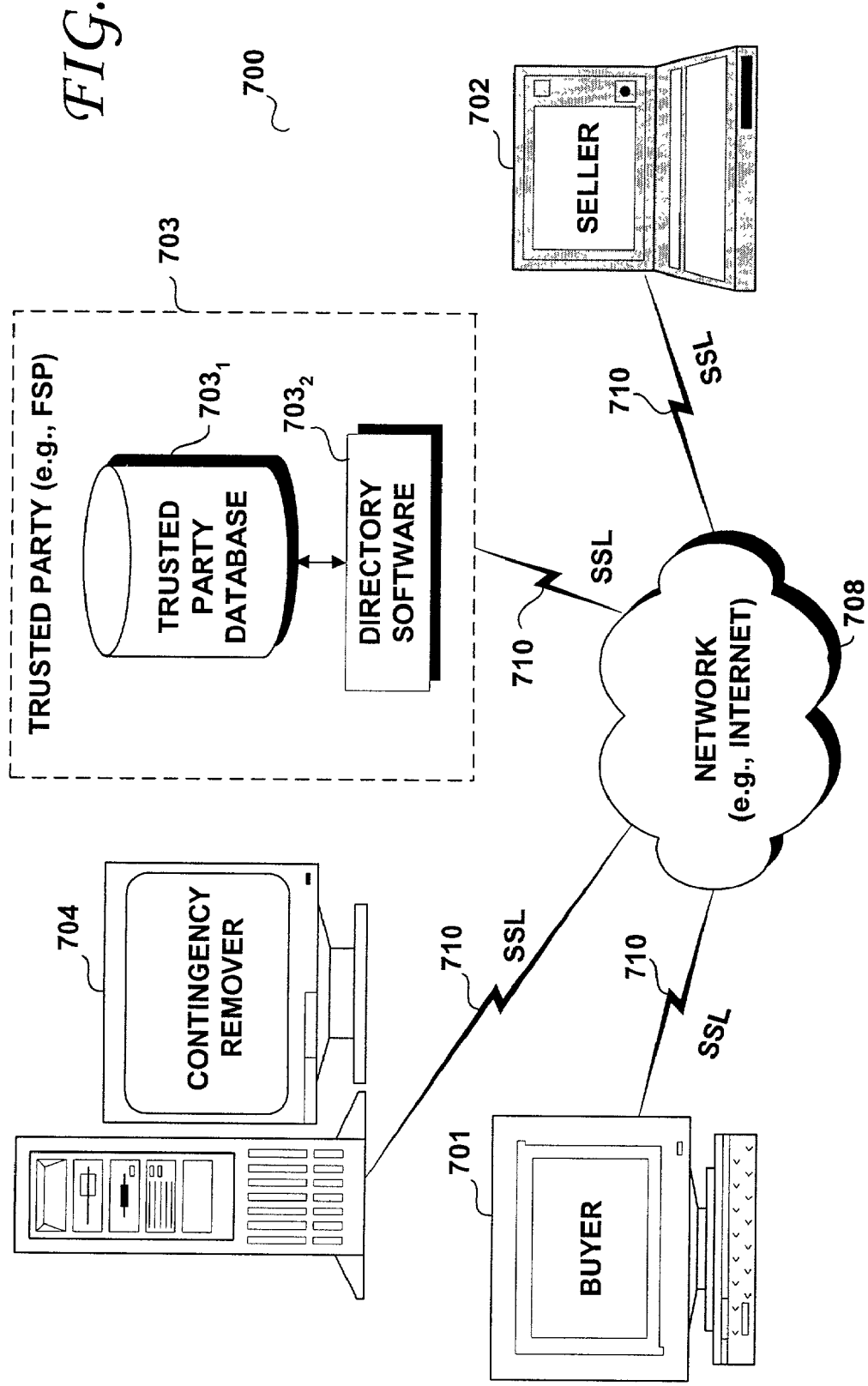
FIG. 7 shows a system or a network of computing devices adapted to carry out an iTX transaction according to an embodiment of the present invention, each of the computing devices or network-enabled devices being coupled to a network, such as the Internet.

FIG. 7 shows a system or a network of computing devices 700 adapted to carry out an iTX transaction according to an embodiment of the present invention, each of the computing devices or network-enabled devices being coupled to a network 708. FIG. 7 shows an example wherein an iTX transaction has been initiated and launched by a trusted party 703 such as a FSP, a corporation with fiduciary duties, governmental agency or other trusted or neutral party to the transaction. As shown in the exemplary representation of FIG. 7, the parties to the involved iTX transaction may include a buyer 701, a seller 702 and a contingency remover 704, each symbolically represented by computed devices. Each of the computing devices 701-704 may have a structure similar to that outlined in FIG. 8, for example. The buyer 701, the seller 702, the trusted party 703 and/or the contingency remover 704, according to an embodiment of the present invention, may utilize personal computers, workstations, Web-based appliances or any other means of accessing the network 708 through one or more of a variety of network access channels 710. Such network access means are generically shown in FIG. 7 at reference numerals 701, 702, 703 and 704. Network access channels 710 may include telephone lines, leased lines, wireless channels and the like. The trusted party's computer (e.g., server), shown at reference 703, is also connected to the network 708 and may include a database $703_1$ and/or Directory software $703_2$. The network 708 may include any type of network, whether public, private or a hybrid of public and private networks. For example, the network 308 may include the Internet. The trusted party 703, according to an embodiment of the present invention, may maintain a Web site that includes a textual and/or graphical representation of the iTX transaction (such as iTX transaction 400 of FIG. 4). The URL or other identifier of such a Web site may be advantageously included, for example, in the encrypted email notification (shown in FIG. 5) sent to each of the requested participants to the involved iTX transaction. After logging onto the trusted party's Web site, each party and/or contingency remover of the iTX transaction may be authenticated in the manner discussed relative to FIGS. 1a, 1b and 2, for example, through the trusted party's Directory software $703_2$ and database $703_1$. To insure transactional security of the constituent iDraft™ and iDraftC™ transactions of the involved iTX transaction, communications with the trusted party 703 may be carried out via the network access channels 710 according to the SSL protocol or according to some other secure communications protocol. The present invention is not, however, limited in its scope to any particular data encryption scheme or secure communication protocol, as suitable encryption schemes and communications protocols are well known to those of skill in the art.

Depending upon the permission level granted by the Directory software $703_2$, each of the parties (and contingency removers) to the iTX may view all or selected portions of the iTX transaction to exercise the option to remove (or to deny) contingencies and/or view the current status of the iTX transaction, for example. For example, both buyer 701 and seller 702 may be granted permission to view the entire iTX transaction, whereas the contingency remover 704 might be granted a permission level consistent with viewing, approving or disapproving those contingencies which he or she has been tasked with approving or disapproving. The use of Directory software in the manner detailed herein is advantageous, as it allows complex transactions to be consummated in an anonymous yet secure fashion. Indeed, access to the buyer's financial information may be restricted to the trusted party 703 (for example, the buyer's home FSP, which already has access to and established measures to safeguard that information). This allows the buyer 701 to restrict the personal information divulged to the seller 702, all the while providing the seller 702 with complete assurance that drafts presented to the FSP 703 through iDraft™ and/or iDraftC™ transactions will be honored, barring FSP-imposed constraints (such as lack of sufficient funds on deposit, for example). Thus, transactional security is assured and buyers and sellers and other parties to the iTX transaction may selectively limit the amount of personal information that is disseminated by choosing to interact in an anonymous, quasi-anonymous or open fashion. For example, in an anonymous mode, the parties may be identified only by their ID, for example. The FSP may contract with a shipping company to arrange delivery of the goods purchased by the buyer, thus further protecting the anonymity of the buyer. The shipping mechanisms (incorporated herein by reference) disclosed and/or claimed in copending and commonly assigned US patent application by the present inventor entitled "eDROPSHIP: Methods And Systems For Anonymous eCommerce Shipment" assigned Ser. No. 09/490,783 and a filing date of Jan. 24, 2000 may be advantageously used to protect the anonymity of the shipper. In this manner, the buyer can prevent the seller from learning his or her address. For legal and law enforcement purposes, the FSP may maintain a paper trail or other durable record of each transaction. Moreover, title to the underlying property of the iTX (e.g., the deed of a track of land, to use the real estate example developed above) may be transferred by the seller 701 only upon success of the entire iTX transaction—such as upon receipt of the iTX success notification shown in step S68 in the flowchart of FIG. 6, which entails that all contingencies have been removed and all payments, whether associated with an iDraft™ or iDraftC™ transactions have been made and credited to the proper account or accounts, in the manner detailed above. Alternately, title to the underlying property may pass to the lender, who may be the buyer's FSP, and the iTX succeeds as well. Alternately still, a third party or Exchange may connect the buyer, seller and FSP(s) or FSPs using the iDraft™ mechanisms detailed herein.

The following implementation examples illustrate sequences of interaction between relevant parties, as an iDraftC™ transaction is authorized by a buyer, subject to specified contingencies. In the following implementation examples, all parties to the iDraftC™ and/or iTX™ transactions may perform appropriate, secure actions remotely (from Web browser software over the Internet, for example), in contrast to the current practice of using in-person holographic signatures. Further, the current practice of using credit card numbers (or similar sensitive and potentially abused personal information) for authentication at Web sites is made unnecessary through the use of iDraftC™ and/or iTX™ transactions according to the present invention. iDraftC™ and/or iTX™ transactions may be employed in a related series of interdependent contingent payments, each payment being logically triggered by the release of one or more contingencies defined by the respective parties to the transaction.

IMPLEMENTATION EXAMPLE 1

Online Auction

In the online auction example, multiple buyers bid on one or more objects or services sold by a seller through a Web site. Neither the buyers nor the sellers wish to needlessly disseminate personal information, yet each desires some assurance that the other party will perform: the auction buyer having placed the winning bid wishes to protect his or her confidential information, wishes to assure him or herself that the item in question is as described by the seller and be assured that the seller will, in fact, deliver the purchased item in a timely manner. The seller, in turn, requires some assurance that the bid amount will be properly credited to seller's account before parting with the involved item. Both parties may wish to protect and restrict the dissemination of their respective personal information without, however, resorting to such identification-surrogates as credit card and/or social security numbers. The present inventions satisfy these requirements by providing an infrastructure including iDraft™ and/or iDraftC™ transactions through an iTX transaction, such as shown at reference 400 in FIG. 4. To do this, according to the present invention, the auction buyer (hereafter, "buyer") may log onto the auction Web site and become authenticated by supplying an identification of his or her home FSP and a personal ID through an SSL, via appropriate browser software. The Directory software at the auction site (provided, maintained and controlled by the auction site's home iDraft FSP in this example) may then request authentication of the buyer from the buyer's home FSP, whose own Directory software will request the auction buyer's password, encrypt the password provided and compare the ID and encrypted password provided by the auction buyer with the matching stored encrypted password for that ID. If the encrypted password and ID pair stored at the auction buyer's home FSP matches the ID and password pair provided by the buyer (the password being encrypted by the buyer's home FSP), the buyer is authenticated for this session only. To maintain security, the auction Web site's FSP may also host the auction site's Web domain at the buyer's home FSP's server, for example, a fact that would be transparent to the buyer.

Once authenticated, the buyer selects an item to purchase from seller and, for exemplary purposes only, is assumed to have placed the winning bid. The buyer wishes to make sure the item is as represented by seller (e.g., nature, quantity, condition). The seller, on the other hand, wishes to make sure that buyer pays as agreed. According to the present invention, the buyer causes an iDraftC™ to be sent an escrow agent (which may be a neutral party, the auction company or the buyer's home FSP, for example) via the auction site software. The escrow agent may then remove the first contingency (buyer payment) after checking with the buyer's home FSP and securing (e.g., placing in escrow, for example) the funds needed to pay the iDraftC™ associated with the item to be purchased. The seller may then send the item in question to the buyer (or may send the item to buyer through the escrow agent), subject to a second contingency (expiration of offer date by which buyer must remove the third contingency (buyer examination)). Assuming now that the buyer examines the item within the time period specified by the second contingency and funds the item satisfactory, the buyer may log onto the auction Web site's iDraft™ page, become authenticated through his or her home FSP in the manner described above and may select the option to remove third contingency of the iDraftC™ transaction in question. The escrow agent may then be automatically notified (via encrypted email, for example) and may then exercise the option to remove the second contingency. The first, second and third contingencies of the iDraftC™ transaction now having been removed, the buyer's home FSP may automatically credit the iDraftC™ payment(s) to the specified seller's account and to the specified escrow agent's account for the escrow agent's fees, if any. This may be done using the buyer's instructions as to whether this is a debit or credit transaction. It should be noted herein that the present invention is universally applicable, irrespective of the exact payment instrument utilized to effectuate the payment. Indeed, credit cards payments, wire transfers or any other payment instrument may be implemented within the infrastructure of the present invention.

The denial of a contingency, such as upon the expiration of the offer date, the failure of an iDraftC™ transaction payment to be funded by, e.g., the buyer's home FSP (either because of over-limit spending or insufficient funds available) or a determination by the buyer that the item is not as represented by seller causes the iDraftC™ transaction to fail. In that case, the fees owing may be automatically collected from the buyer (and/or the Seller if the seller has agreed to post fees), and the buyer's home FSP may send an iDraftC™ transaction to the buyer (a refund of the amount placed into escrow, less expenses) contingent on escrow agent's receipt of the inspected item and the non-expiration of a new transaction date.

IMPLEMENTATION EXAMPLE 2

Real Estate Transaction

A real estate sale may be handled through a trusted party such as an escrow agent that is a member of the iDraft™ system. The escrow agent's FSP (the escrow agent and the FSP may be one and the same) may enroll selected employees (agents) of the escrow agency, with appropriate privileges assigned through the trusted party's (e.g., FSP's) Directory software at the time IDs and passwords are created. The escrow agent may create an iDraftC™ transaction from his or her account as a contingent payment to the real estate seller, including all necessary contingencies in the instrument and assuming that the final payment is to be received by the seller after all other funds are distributed and all other contingencies are removed. The escrow agent may create an iTX™ transaction that includes the iDraftC™ transaction above and iDraft transactions to other parties to pay off loans, pay fees or encumbrances on the real estate, pay real estate sales commissions, and the like. The iDraftC™ transaction may allow removal of payment contingencies where some payments are made by check, by debt forgiveness or by spousal quitclaim, for example. Payments made on iDraftC™ transactions may automatically remove the corresponding contingencies of the iDraftC™ transaction once the FSP of the intended payee receives payment.

Inspections by the buyer are an ordinarily part of any real estate transaction and the buyer (or designated contingency remover) may remotely remove such contingencies via his or her browser software, for example, by accessing the pending iDraftC™ transaction at the escrow agent's site and by exercising an option to remove a contingency by checking, for example, a "remove contingency" box presented by the iDraft™ system software.

According to an embodiment of the present invention, all contingency-related actions may be performed at the home iDraft™ FSP of the owner of the option, where iDraft™ contingency-related messages are stored in the same manner as pending iDraft™ transactions. The contingency-related messages may be sorted apart from pending iDraft™ transactions. Moreover, the contingency-related messages may themselves be pending iDraft™ transactions awaiting approval of the iDraft™ account holder. If the owner of the option is not currently an account holder at an iDraft™ FSP with iDraft™ privileges, the owner must become an account holder at such a FSP and request iDraft™ privileges in order to participate in such an iTX™, iDraft™-C or iDraft™ transaction.

Funds received by the escrow agent for down payments may be implemented as iDraft™ transaction payments from the buyer, subject to (at least partial) repayment if the overall real estate transaction (and thus the iTX™ transaction modeled thereon) fails for any reason. Such an iTX™ transaction likely contains both unconditional payments (iDraft™ transactions) and contingent payment (iDraftC™ transactions) and may succeed only if all constituent iDraft™ and iDraftC™ transactions succeed and are paid. Otherwise, the escrow agent may return all funds in accordance with the iDraftC™ transaction agreement, by sending unconditional payments (iDraft™ transactions) to the appropriate parties, minus any appropriate transactional fees, for example.

iDraftC™ Management Letters of Credit (iLofC™)

To allow FSPs to safely promise to pay the seller or the seller's FSP when all contingencies associated with an iDraftC™ and/or iTX™ transaction are removed, iDraftC™ preferably requires that the buyer's FSP sequester (escrow) funds in the buyer's account sufficient to make the necessary payments on the pending transaction(s), the payments being released only when and if all contingencies associated with the transaction are removed. The present invention also provides for an alternative mechanism, called an iDraft™ Letter of Credit or iLofC™. A letter of credit generally refers to an engagement by a FSP to honor drafts and/or other demands for payment upon satisfaction of all terms and conditions (previously agreed upon between the FSP and the depositor) in the credit. Such terms, for example, may make the iLofC™ irrevocable or revocable, for a term certain or for an indefinite time period. The conditions may impose constraints upon the buyer and/or the seller, such as a requirement to present stipulated documents prior to the FSP releasing payment on the iDraft™, iDraftC™ and/or iTX™ according to the present invention. An iLofC™ may be issued by a FSP to one of its depositors. The iLofC™ may be linked to a depositor's account managed under iDraftC™ and functions to increase the value of that account for purposes of determining whether sufficient funds are available to support a purchase.

Advantageously, according to the present invention, the stipulated documents will be on line, version-controlled, approved by all relevant parties and constitute an integral part of the iLofC™ transaction. Elements in the stipulated document or documents subject to future approval (such as receipt of shipment and approval of invoice) are preferably handled via contingency entries by the holder of the privileges implied in ownership of the contingency or contingencies. Indeed, edited documents preferably require approval by the same authorities as the original, unedited document. The approval process for a revision level may include contingencies which, when removed, imply approval of the revisions and/or the edited document. Many conventional transactions fail due to documents that do not exactly match. According to the present invention, the use of online documents, approved by all parties, cures this problem and adds a great deal of functionality to the iLofC™ mechanism described herein.

When an iLofC™ according to the present invention is added to a buyer's account, the buyer does not lose control of existing funds, as would occur had the buyer committed payment through iDraft™ and/or iDraftC™ on a cash account basis. The FSP may not charge interest on an iLofC™ linked to an account; rather, the FSP may charge a fee for the iLofC™ service and promise to the seller that sufficient funds will be available and paid when the contingencies are removed, subject to the credit limit of the iLofC™. The iLofC™ mechanism advantageously enables the seller to rely upon the FSP's promise to pay, solvency and reputation rather than that of the buyer. If sufficient funds to cover the requisite payment are not available in the buyer's account when the contingency or contingencies are removed, the actual payment through iDraft™ and/or iDraftC™ will trigger iLofC™'s loan provisions on which the account holder and the FSP have previously agreed, as specifically memorialized in the iLofC™. The amount of funds in the buyer's account and the triggering of the iLofC™ provisions are all preferably transparent to the seller, who should only see the FSP's promise to pay.

The type of purchase, the validity time limits and other conditions, the goods, and the seller may all be specified in the iLofC™ for iDraftC™ and such information may be part of the determination of sufficient funds. The FSP and the buyer must conclude a credit agreement prior to the FSP issuing the iLofC™ and before the execution of any given iDraftC™ payment which may trigger the iLofC™. The buyer may, at any time prior to the release of payment, avoid activation of the iLofC™ credit arrangement by adding sufficient funds to his or her account to cover the iDraftC™ payment independently of the iLofC™.

The FSP may set the terms of the iLofC™ as to whether it is available for one time use (for a single transaction) or whether it is renewable after use thereof. The FSP may charge a fee for the use of the iLofC™ and may require that this fee be paid (debited from the iLofC™ holder's account, for example) when the iLofC™ is linked to the account. Note that the iLofC™ is never spent; rather, it represents the FSP's promise to pay on the assumption that credit arrangements made with the FSP are sufficient to support the iLofC™. The goods purchased through iDraftC™ and iLofC™ may themselves be the security for a separate loan. The FSP may be granted a security interest in the goods received by the drawer (the buyer) in exchange for the payment released to the drawee (the seller).

An advantage of using iDraftC™ with iLofC™ according to the present invention is that the FSP may control and administer the Letter of Credit represented by the iLofC™ to prevent unintended or unauthorized use by the holder of the Letter of Credit, to insure that the holder is able to access an accounting of the status of the Letter of Credit, and to insure that credit arrangements underlying the Letter of Credit are appropriately tied thereto. The seller (drawee of the draft) preferably does not view, have access to or knowledge of the iLofC™; rather, the capability of the buyer for payment is evidenced by the buyer's FSP making a payment promise that is contingent on delivery and acceptance of the involved goods (and other factors as agreed between buyer and seller). The seller then has the FSP's promise to pay and may ship the goods accordingly, without even knowing the buyer's identity and his or her creditworthiness (or his or her address, according to the provisions of co-pending and commonly assigned US patent application entitled "eDropship: Methods And Systems For Anonymous Ecommerce Shipment", Ser. No. 09/490,783 filed on Jan. 24, 2000, the disclosure of which is incorporated herewith in its entirety). In this manner, the seller need not know anything about the buyer, but for the buyer's ability to pay for the requested goods and/or services through the iDraftC™ mechanism and/or transparently through the iLofC™ mechanism described herein.

Figure 9:
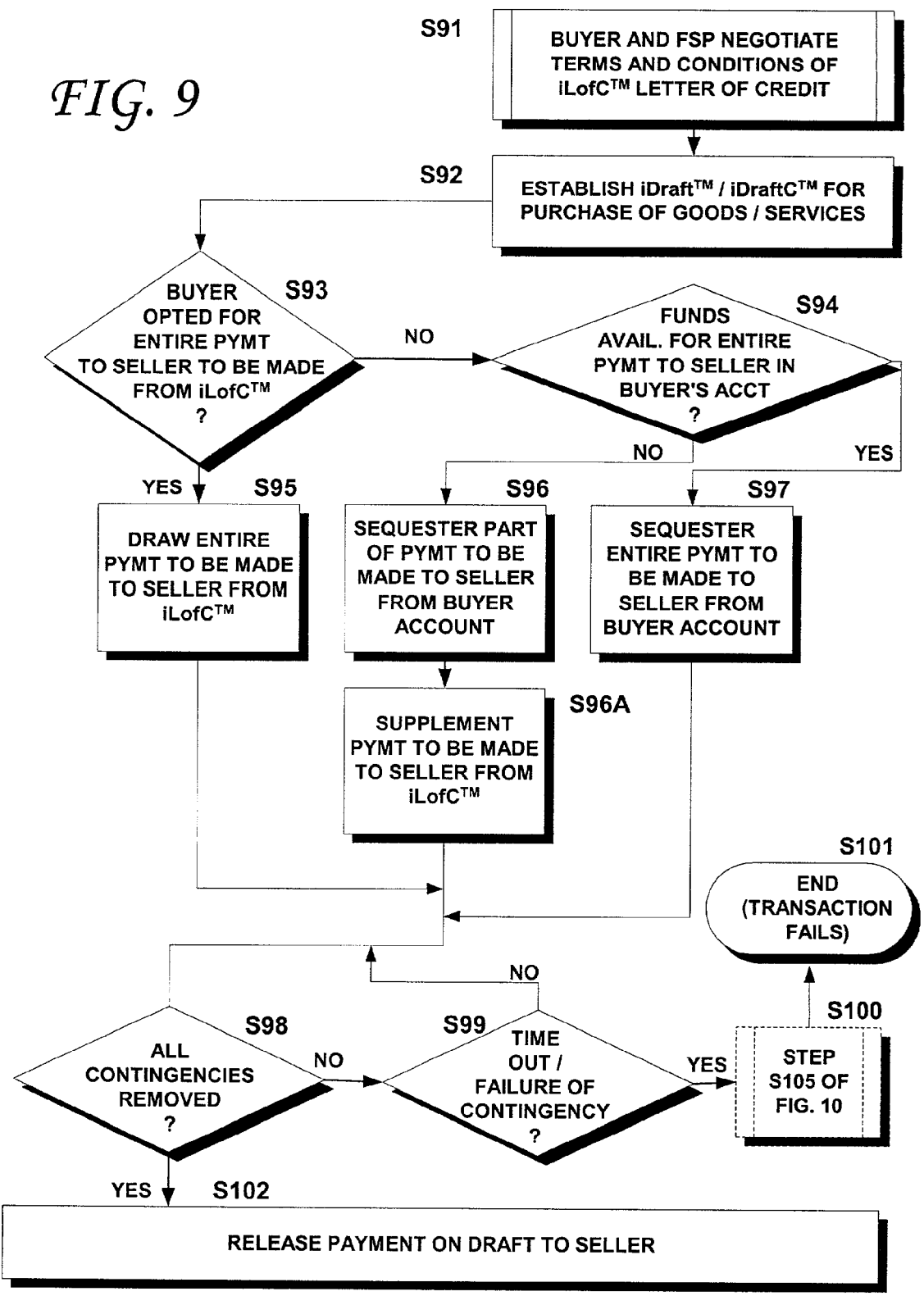
FIG. 9 is a flowchart of an example of an operation of an iLofC™ letter of credit in an online transaction, according to an embodiment of the present invention.

FIG. 9 is a flowchart of the operation of iLofC™, according to an embodiment of the present invention. As shown at S91, the buyer (the drawer of the draft underlying the online transaction) negotiates the terms and conditions of an iLofC™ letter of credit. Alternatively, the buyer may simply select from among a plurality of pre-configured iLofC™ financial products offered by his or her FSP or other trusted entity for which he or she qualifies. As shown at S92, an iDraft™, an iDraft-C™ and/or an iTX™ may be established for the purchase of goods and/or services, as detailed above relative to FIGS. 1-7. Step S93 calls for the determination of whether the buyer opted to have entire payment to be released to the seller originate from the iLofC™ established in step S91. This option would allow the buyer's funds on deposit with the FSP to remain available to the buyer for other purposes and prevents the FSP from sequestering and rendering unavailable an amount of the buyer's funds on deposit with the FSP at least equal to the payment to be made to the buyer. Alternatively, step S93 may be omitted altogether. If the buyer has opted for the entire payment to seller to be made from the iLofC™ linked to his or her account, the FSP will extend credit to the buyer according to the terms and conditions of the iLofC™ negotiated in step S91 when and if payment is made to the seller of the online transaction, as shown at S95. Indeed, as the FSP will draw from its own funds (and correspondingly extend credit to the buyer), it may be unnecessary for the FSP to sequester its own funds in anticipation of releasing payment to the seller at some later time. If the buyer has not opted to have the entire payment to be made to the seller to originate from the iLofC™, step S94 may be carried out. In step S94, it may be determined whether the buyer has sufficient funds on deposit with the FSP to cover the payment to be released to the seller. If the buyer does not have sufficient funds on deposit with the FSP to cover the entire payment to be made to the seller, (NO branch of S94), only a portion of the payment to be released to the seller may be sequestered from the buyer's account, as shown at S96. The balance of funds to be released to the seller, as shown at S96A, may be drawn from the buyer's iLofC™ letter of credit. If sufficient funds are indeed available from the buyer's account(s) with the FSP as shown at S97, an amount at least equal to the entire payment to be released to the seller may be sequestered from the buyer's account. The FSP may assess a fee at any step of the present method. For example, upon sequestering funds from the buyer's account, the FSP may sequester and/or debit a pre-arranged fee therefrom.

In step S98, it may be determined whether all contingencies have been removed, either automatically upon the occurrence of a specified event or by an affirmative action of an appropriately authenticated person(s) having the authority to remove the contingency. For example, the success of the online transaction may be dependent upon the satisfaction or removal of date and/or time contingency, such as a specified time limit for the buyer to inspect the goods after having received them from the seller. In this scenario, the buyer of conforming or acceptable goods may log onto the secure Web site hosted by the FSP, become authenticated, securely view the status of the online transaction and remove the "inspection" contingency, thereby triggering the release of the payment to the seller from the sequestered funds and/or from the iLofC™ letter of credit. Alternatively, the date and/or time contingency may time out a specified time period after the seller has indicated that the goods have been shipped. The nature of the contingency or contingencies is/are limited only by the structure of the online transaction. After all contingencies have been removed, the payment may be released to the seller, as indicated at S102. If all contingencies have not been removed, it may be determined whether a date and/or time limit has been exceeded and/or whether one or more of the contingencies have failed, as shown at S99. In the case of an online transaction drawn to a residential home purchase, for example, a residential home inspection contingency may have been failed or the home inspector may have failed or somehow neglected to remove the home inspection contingency in a timely manner. If all contingencies have not been removed and none of the contingencies have timed out or otherwise failed, step S98 may be repeated, as described above. If a contingency has not been removed and/or one of the contingencies has timed out or otherwise failed, the method may proceed directly to step S101, in which the transaction fails. The method may also proceed to optional step S100, in which step S105 and subsequent of FIG. 11 may be carried out, as detailed below, followed by step S101.

IDRAFT™ Performance Bonds (IPBOND™)

The iDraft™ performance bond function (iPBond™) is very similar to iLofC™. The iPBond™ may or may not be linked in the account of the buyer if there is already an iLofC™ in that account. Only if the buyer (drawer of the underlying draft) and seller (drawee of the underlying draft) agree that the damages to a seller if the buyer reneges on the agreement not to cancel the purchase of goods or services (by denying the contingency) could exceed the credit limits of the iLofC™ and/or the sequestered funds already earmarked for the purchase would the iPBond™ be deposited in or otherwise linked to the buyer's account (after the terms and conditions thereof are negotiated between the buyer and the buyer's FSP). In this case, the iPBond™ functions to compensate the seller for loss (in the form of liquidated damages, for example) in the case of nonperformance on the buyer's part. The seller preferably does not see, have access to or knowledge of the iPBond™ (unless the seller himself or herself secures a separate iPBond™ as against default on the buyer's part). Moreover, the triggering of the iPBond™ may be wholly transparent to the seller (the beneficiary of the iPBond™) in the case wherein the buyer fails to perform. The seller, as is the case with the iLofC™, sees only the buyer's FSP's promise to pay. The buyer's FSP may notify the buyer and the seller if there is not sufficient capability to execute the pending purchase for whatever reason.

Another purpose of iPBond™, however, is to protect the buyer against default by the seller. In this case, the seller's FSP would link an iPBond™ to the seller's account, the terms and conditions of the iPBond™ having been negotiated between the respective parties. An example of such a default would be a sale in a rising market for goods: the buyer may have obtained what he or she perceives as a fair deal at the time of purchase and a better deal later (just prior to the scheduled shipment of the goods from the seller to the buyer). The seller may be tempted, absent the iPBond™, to default on the sale and to refrain from shipping the goods as promised. This would allow such a seller to collect a premium from the differential in market prices for the sale of such goods, as measured between the time of purchase by the buyer and the time of sale thereof at a relatively higher price to another buyer. An online performance bond according to the present invention would discourage such behavior by providing the seller with a built-in incentive (in the form of liquidated damages, for example) to perform according to the agreement with the buyer. The iPBond™, deposited in the seller's account, may be adjusted by the buyer and seller to underwrite their agreement as to price and terms; any seller default would be covered by recourse to the iPBond™ as per the agreement between the buyer and seller.

There may be a host of other reasons for non-performance by the seller. These might include fire, natural disaster, strikes, accidents, and other events both in and out of the control of the seller. Yet, a buyer may require some assurance that the purchased goods will nevertheless be available. The FSP and/or its partners may underwrite the performance risk from knowledge of the seller and the seller's past performance. The FSP and its partners (if any) may collect a fee from the seller (if the iPBond™ is deposited in the seller's account) or from the buyer (if the iPBond™ is deposited in the buyer's account).

An iPBond™, according to the present invention, may be useful for both buyers and sellers. Indeed, the iPBond™ may be configured to default on either the terms and conditions in the underlying agreement between the buyer and seller and/or on the agreement to perform the underlying transaction between the parties. An example of default would be the buyer's failure to timely remove contingencies even through the seller shipped the goods underlying the transaction in good faith. Similarly, failure to ship as agreed upon between the parties may constitute default on the part of the seller. By agreement, both parties may add more time to comply with the terms and conditions of the agreement or to ship the goods and/or provide the specified services. According to the present invention, default of an iPBond™ may be a default of the terms and conditions of the underlying agreement between the parties to the transaction, as well as inappropriate actions with respect to any contingencies. The agreement as to what constitutes default should appear in one or more of the documents that support the iPBond. It is also understood that the terms and conditions are accompanied by a document with a full and complete (by agreement) description of the goods and/or services being exchanged.

Buyers and sellers may set the extent of any such iPBond™ and the FSP may administer the iPBond™ in accounts it manages according to instructions and/or predetermined terms negotiated between the parties and set at the time of the iDraft™ purchase. An iPBond may be secured from any iDraft™-participating FSP, financial institution or from an authorized intermediary acting as an agent for the FSP by either the buyer or the seller, depending upon each party's evaluation of the risk of loss due to a possible non-performance by the other party. The procedures for collecting funds from the iPBond™ will be set by the respective buyer's and/or seller's FSPs. iDraft™ iPBond™ provides a software function so that the FSP may deposit and administer iPBond™s; iDraft™ does not itself compel any terms or act apart from administration by a trusted entity such as a FSP.

The buyer's FSP may sequester sufficient funds from the buyer's account to pay the liquidated damages to the seller in the case of the buyer's non-performance as measured according to the terms of the online transaction. In the case wherein (for example) insufficient funds are available in the buyer's account for the buyer's FSP to release payment on the draft or to pay the liquidated damages to the seller, an iLofC™ may be created and credit extended to the buyer according to terms negotiated between the buyer and the buyer's FSP. The credit inherent in an iLofC™ may also be extended to the buyer even if sufficient funds are available in the buyer's account, as agreed upon between the buyer and the buyer's FSP. In other words, an iLofC™, according to the present invention need not be based upon the non-availability of funds in the buyer's or seller's account(s). A fee may be levied against the buyer for the creation and maintenance of the iLofC™, which fee may be debited from the buyer's funds on deposit in the buyer's FSP. In this manner, iPBonds™ and iLofC™ may operate in concert to provide the buyer with greater access to capital while providing the seller the assurance of liquidated damages in the event of the buyer's breach.

Similarly, an iPBond™ may be created by the seller's FSP and linked to the seller. In the event that sufficient funds are not available in the seller's account to cover the payment of the liquidated damages due to buyer upon seller's non-performance according to the terms of the online transaction, an iLofC™ may be created to extend credit to the seller according to predetermined terms. In this manner, at least a portion of the liquidated damages defined in the iPBond™ that are due the buyer upon the seller's non-performance may originate from the credit extended to the seller under the iLofC™. The buyer and seller may maintain accounts in the same or different FSPs (or some other trusted entity—or entities—that maintains uniquely identified accounts). Whereas an iLofC™ may be linked to a party's account and may be effective to extend credit for a number of online transactions (subject to the terms and conditions thereof), an iPBond™ may only (but need not) be created for high value transactions where each party (or one of the parties) desires to limit their risk exposure should the other party fail to perform.

Figure 10:
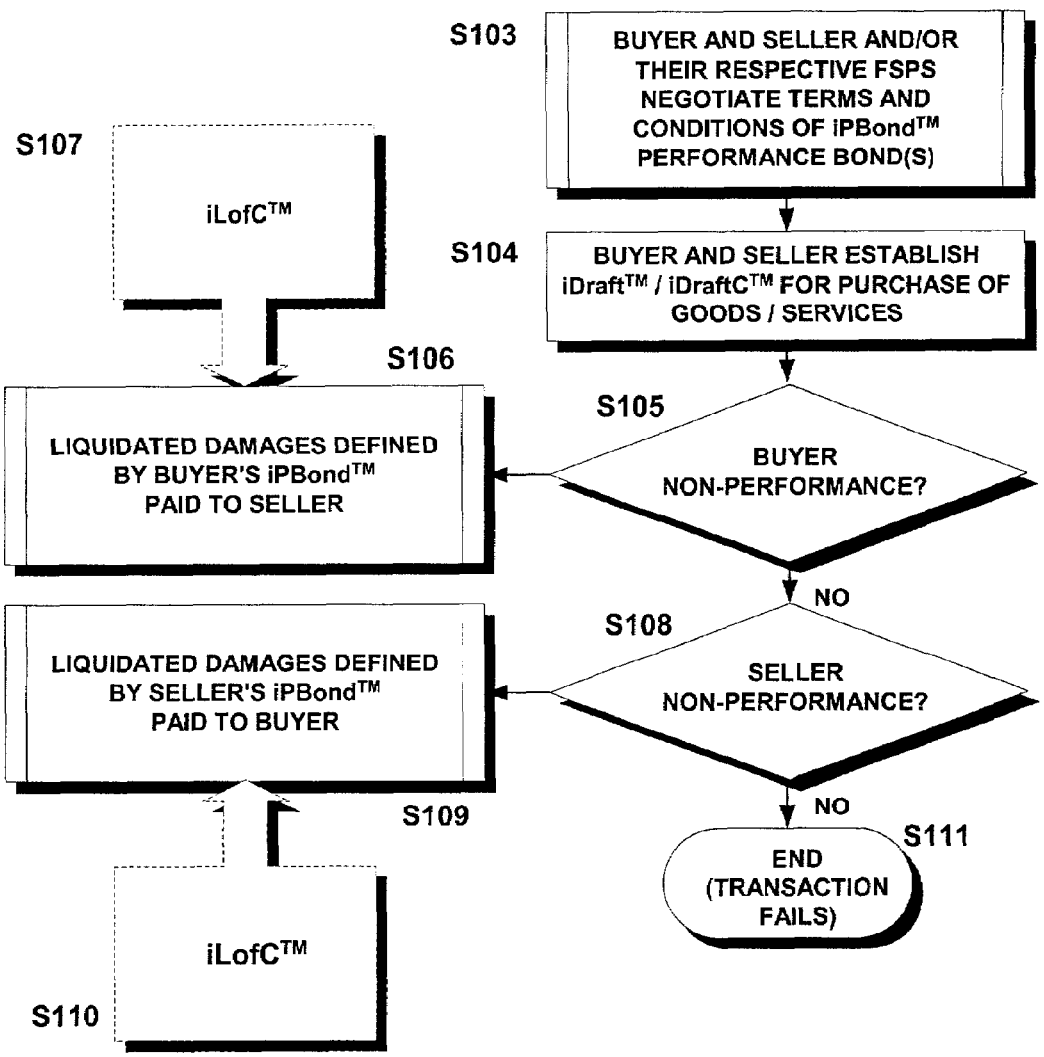
FIG. 10 is a flowchart of an example of an operation of an iPBond™ performance bond, according to an embodiment of the present invention.

FIG. 10 shows one possible operation of the iPBond™ performance bond according to an embodiment of the present invention, and its relation to and interaction with the iLofC™ letter of credit mechanism detailed above. The method detailed in FIG. 10 may be carried out together with that of FIG. 9 or entirely independently therefrom. As shown in FIG. 10 at S103, the buyer and the seller and/or their respective home FSPs (the buyer's FSP and the seller's FSP) may negotiate the terms and conditions of one or more iPBond™. For example, both buyer and seller may have agreed to post a separate performance bond, one being held and controlled by the buyer's FSP and activated only upon the buyer's non-performance and the other held and controlled by the seller's FSP, to be activated only upon non-performance on the part of the seller. As shown at S104, the buyer and seller may establish an iDraft™, an iDraftC™ and/or an iTX™ for the purchase and sale of goods and/or services, as detailed above relative to FIGS. 1-7. In step S105, it is determined whether there has been non-performance by the buyer. Such a non-performance may be detected by failure of a contingency and/or by failure to remove a contingency in a timely manner, for example. If NO, it is determined whether there has been non-performance on the seller's part, as shown at S108. Such a non-performance may also be detected by failure of a contingency and/or by failure to remove a contingency in a timely manner, for example. If not, the transaction may fail, as shown at S11, even through none of the parties may have failed to perform according to the terms of the transaction.

If however, non-performance on the buyer's part is detected at S105 (by a time limit contingency lapsing and/or a party and/or contingency remover logging onto the secure iDraft™ Web site and affirmatively causing a contingency to fail, for example), step S106 may be carried out and the liquidated damages defined by buyer's iPBond™ may be paid to the seller, if all terms and conditions for the payment of such liquidated damages are met. If the buyer's funds on deposit with his or her FSP are insufficient to cover the liquidated damages paid or to be paid to the seller, an iLofC™ linked to the buyer's account may provide the buyer with the credit necessary to enable the FSP to pay the liquidated damages to the seller, as shown at 107. If non-performance on the seller's part is detected at S108, step S109 may be carried out and the liquidated damages defined by seller's iPBond™ may be paid to the buyer, if all terms and conditions (as defined in the seller's iPBond™) for the payment of such liquidated damages are met. If the seller's funds on deposit with his or her FSP are insufficient to cover the liquidated damages paid or to be paid to the buyer, an iLofC™ linked to the seller's account may provide the seller with the credit necessary to enable the FSP to pay the liquidated damages to the buyer, as shown at S110.

A third party, such as the operator of an Exchange or an ecommerce site may also be involved in the transaction between the buyer and the Seller. Indeed, the buyer and the seller may be using the exchange in conjunction with one or more Financial Service Providers (FSPs) registered with the Exchange. According to the present invention, for FSPs not registered with the Exchange, confirmed iLofC™ and/or confirmed iPBond™ may allow buyers to participate with their own unregistered FSPs. The buyer, seller and/or FSP may register with the Exchange or with the third party and the iDraft™ mechanisms described herein would then function as an agent of any of these parties, exchanging secure messages between them and operating the iDraft™ software at the third party site. Extended markup Language (XML), Electronic Data Interchange (EDI) or other secure messaging protocols (each of which is incorporated herein by reference) known to those of skill in this art may be used to connect iDraft™ with the third party site and its registrants.

Figure 8:
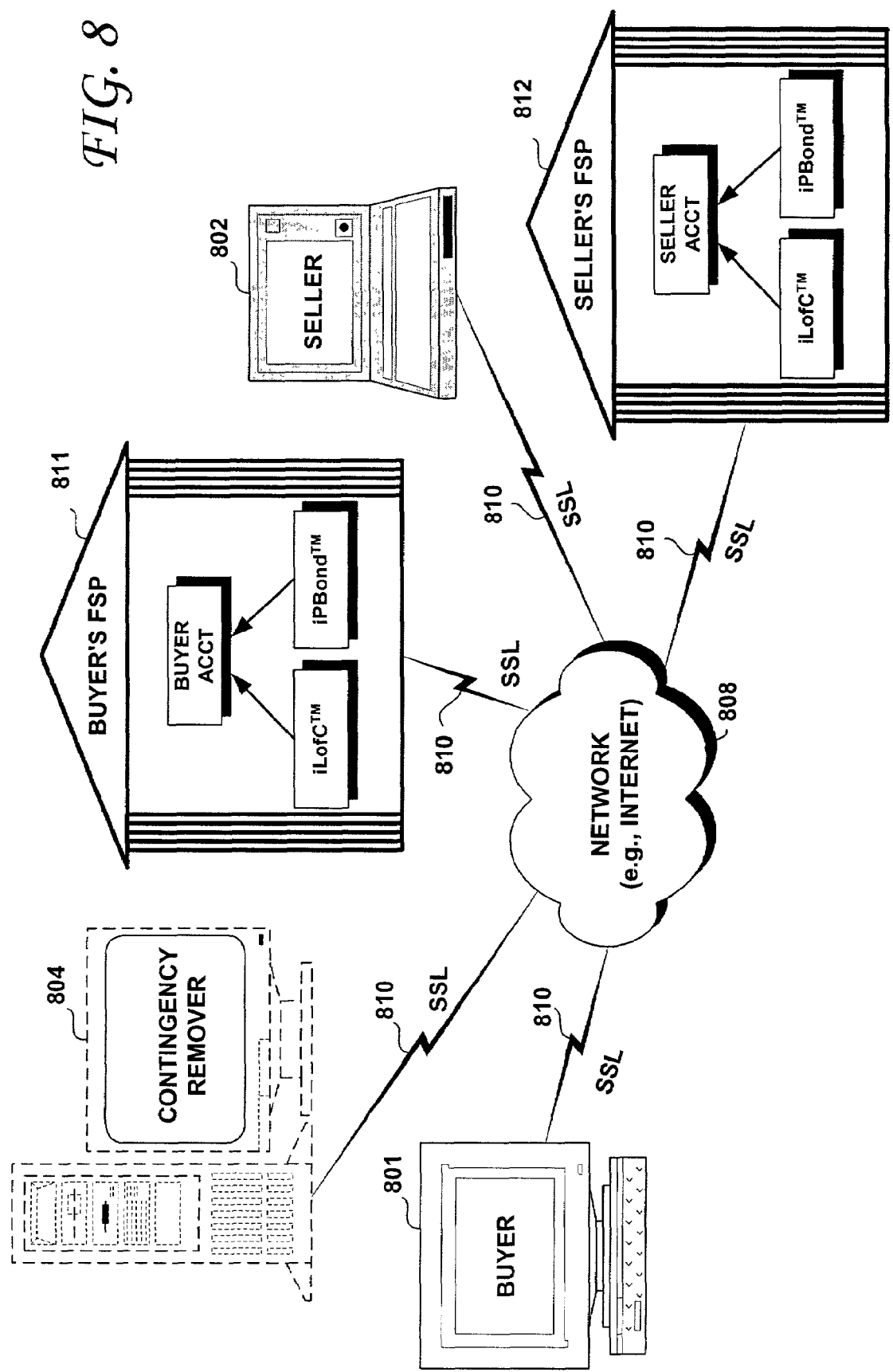
FIG. 8 shows a system of computing devices adapted to carry out an iDraft™ online transaction supported by an iLofC™ letter of credit and/or an iPBond™ performance bond, according to an embodiment of the present invention.

FIG. 8 shows a system of computing devices adapted to carry out an iDraft™ online transaction supported by an iLofC™ letter of credit and/or an iPBond™ performance bond, according to an embodiment of the present invention. As shown therein, the buyer, seller and contingency remover(s) are represented by their respective computing devices 801, 802 and 804. Contingency remover(s) 804 are shown in dashed lines, as the buyer 801 and/or the seller 802 may themselves be the contingency remover(s). Alternatively, the contingency remover(s) 804 may be a person or entity altogether separate from the parties to the online transaction. Each of the buyer(s) 801, the seller(s) 802 (the online transaction may include more than one buyer and/or seller) and the contingency remover(s) 804 may each be coupled to a computer network 808 (including the Internet, for example) via a secure communication channel 810 such as a Secure Socket Layer (SSL), for example. The buyer's FSP 811 and the seller's FSP 812 may also be coupled to the network 808. The buyer's FSP 811 and the seller's FSP 812 may be the same FSP or may be different FSPs that agree to carry out the present method or otherwise belong to an iDraft™ Association which, as detailed above, may be formed as an oversight and standard-setting organization to monitor the iDraft™ activities of each participating FSP and to administer the common rules that each iDraft™ FSP agrees to follow. As shown in FIG. 8, the buyer's FSP 811 may maintain the buyer's funds on deposit therein in a numbered account. The buyer's account, as set forth above, may have an iLofC™ letter of credit and/or an iPBond performance bond linked thereto. Similarly, the seller's account in the seller's FSP 811 may have an iLofC™ letter of credit and/or an iPBond™ performance bond linked thereto. The release of the payment from the buyer to the seller may thereafter be made (if all contingencies are removed or otherwise satisfied) directly from the buyer's account in buyer's FSP 811 to the seller's account in the seller FSP 812, via the network 808, for example. Advantageously, when using the ILFOFC™ and/or iPBond™ of the present invention, no credit decision need be made by the seller, who is able to rely upon the FSP's promise to pay, rather than the buyer's credit or promise.

The present invention is also applicable to so-called blanket or requirements orders. Such blanket orders may include, for example, provisions for periodic deliveries at an agreed upon price for a fixed or variable amount of goods, subject to an agreed upon upper and/or lower limit and/or agreed upon contingencies for payment and/or deliveries (for example). For example, a buyer may execute a purchase for a specified term (yearly, for example) on a secure Web site of a participating iDraft™ vendor, using a provided "Blanket Order" option on the site. In such a case, the iDraft software may treat the purchase as an iDraftC™ transaction, wherein one of the contingencies is the timely delivery to the buyer of the agreed upon goods at the agreed upon price. The buyer, once authenticated, may inspect the contingent draft on the seller's or the FSP's secure iDraft™ site and/or may receive an email or other notification detailing the contingent draft. Once the goods have been timely delivered, the buyer may then remove the delivery contingency and payment on the contingent draft is released by the FSP.

Similarly, the open orders may also be readily modeled using iDraftC™ according to the present invention. Open orders are similar to blanket orders, except that the price for the goods may not be fixed nor have any upper limit. For example, the price for the goods may be tied to some mutually recognized commodity standard (futures market, etc.). The buyer may select an "Open Order" option on the secure Web site of a participating iDraft™ vendor and appropriate dependencies may be established, as described above.

Most any other type of order may also be modeled using functionality of the present invention, including auction orders, which is similar to a blanket order, except that the buyer may hold an auction prior to initiating the order in order to set the price for the goods. Subscription orders may also be modeled according to the present invention. Subscription orders are similar to blanket orders, except that the price of the goods is fixed. Indeed, by appropriately crafting the contingencies and the mechanisms for compensating the parties due to non-performance or other situational occurrences, any type of order and/or payment scheme may be defined, using the iDraft™, iDraftC™, iPBond™ and iLofC™ tools described herein.

Trade Finance Modeling Using iDraft™, iDraftC™, iPBond™ and iLofC™

Advantageously, the contingency features of iDraft™ supplement functionality of both iPBond™ and iLofC™ according to the present invention. For example, the FSP's (or other trusted party or intermediary that satisfies the requirement of and agrees to be bound by iDraft™) promise to pay is substituted for the buyer's promise to pay, which increases the seller's confidence that payment will be made. The iDraft™ and/or iDraftC™ transaction hosted by the FSP or other trusted entity or intermediary, may include identifiers for the products and/or services underlying the transaction between the parties, as well as a detailed description of the terms and conditions of the sale. The iDraft™ and/or iDraftC™ transaction may also include a detailed description of the terms of the iLofC™ online letter of credit, which may be viewable on the secure Web site by properly authenticated parties to the transaction. The iDraft™, iDraftC™ and/or any associated iLofC™ may include a description of any agreement between the buyer(s) and seller(s) as to the purchase order(s), terms and/or conditions, as well as any invoice (which may, in turn, reference the purchase order(s) in partial fulfillment thereof). The FSP, moreover, may validate to the satisfaction of the parties, any documents that may be relevant to the iLofC™ letter of credit and/or the transaction to which the letter of credit is applied. The following examples illustrate the usefulness and application of iLofC™, according to the present invention. It is understood, however, that the present invention is not limited to the examples given below.

Simple Payment:

A simple payment occurs in a transaction in which no contingencies are specified and only the terms specified at the time of the sale (if any) constrain payment. Thus, a combination of iDraft™ and iLofC™ may be used to model such a transaction or any non-contingent or unconditional payment by guaranteeing payment by substituting the FSP's promise to pay for the buyer's promise to pay.

Performance Guarantee

The contingency features inherent in combinations of iDraft™, iDraftC™, iPBond™ and iLofC™ allows a FSP or other financial institution (such as an insurance company, for example) to define the performance expected by the buyer of the guarantee, who may be either the buyer or the seller or some other party to the transaction. The iLofC™ and/or iPBond™ transaction may be provided with the specific instances of behaviors that may trigger the payment of the buyer of the guarantee. Essentially, the performance guarantee may warrant that the buyer would pay the seller on time and as agreed, that the seller would ship the goods as agreed and/or that the goods are conforming. The performance guarantee inherent in such an iLofC™ is essentially insurance against damages should one or more of the parties renege on any of the listed terms and/or conditions of the underlying iDraft™ or iDraftC™ and/or iPBond™ transactions.

Marine Insurance

Marine insurance, or insurance carried in connection with any mode of shipment, may be modeled as an iLofC™ or iPBond™ with appropriate contingencies, as defined by iDraftC™. That is, the beneficiary may be awarded pre-agreed funds to compensate for a loss according to the terms and conditions of the underlying transaction. For example, delivery as required of the purchased goods may be impossible due to the loss of the goods. Disbursement of the funds provided under either an appropriately configured iLofC™ or iPBond™ may function as insurance to compensate the buyer and/or the seller (depending upon the underlying agreement) for the loss.

Cash Escrow

Cash may be held in escrow by the FSP the absence of a loan under the provisions of an iLofC™, and the contingency provisions inherent in a combination of iDraftC™ and iLofC™ allows the contingent release of the funds to a specified payee or to specified payees. This model may apply to all escrow transactions, including real estate transactions.

By appropriately modeling the transaction using combinations of iDraft™, iDraftC™, iLofC™ and/or iPBond™ according to the present invention, it is possible to model most any trade finance financial instrument, including any risk and contingency-based underwriting of payment terms, as detailed in the examples above.

To further reduce the cost of transferring funds between the buyer's FSP 811 and the seller's FSP 812 to a minimum, the FSPs 811 and 812 may adopt the messaging methodology described in commonly assigned and co-pending U.S. provisional patent application 60/199,932 filed on Apr. 26, 2000 entitled "Many To Many Correspondence: Methods And Systems For Replacing Interbank Funds Transfers", the disclosure of which is incorporated herein in its entirety.

Hardware Overview

Figure 11:
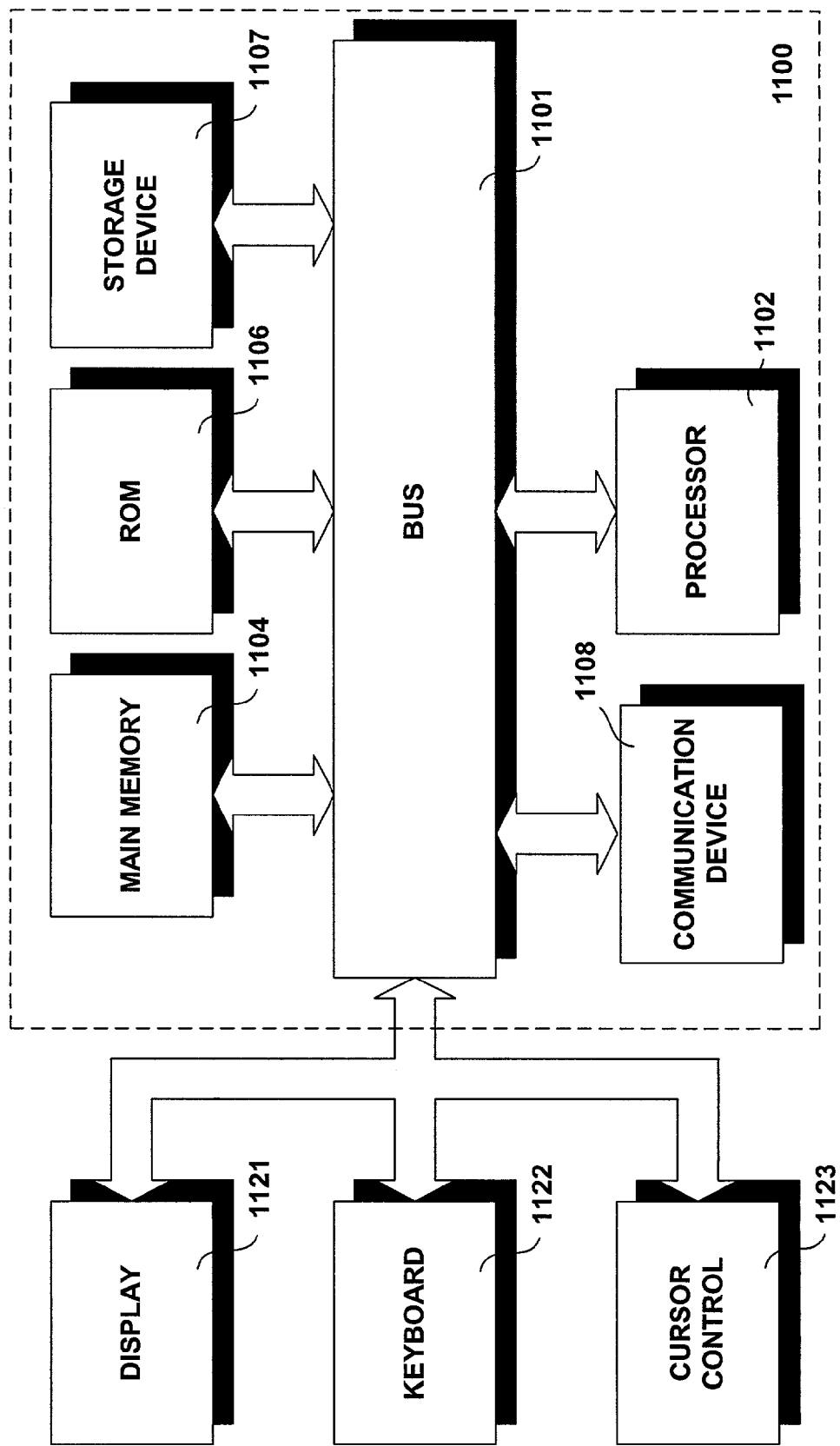
FIG. 11 illustrates a block diagram of a computer with which an embodiment of the present invention may be implemented.

FIG. 11 illustrates a block diagram of a computer 1100 with which an embodiment of the present invention may be implemented. Computer system 1100 includes a bus 1101 or other communication mechanism for communicating information, and a processor 1102 coupled with bus 1101 for processing information. Computer system 1100 further comprises a random access memory (RAM) or other dynamic storage device 1104 (referred to as main memory), coupled to bus 1101 for storing information and instructions to be executed by processor 1102. Main memory 1104 also may be used for storing temporary variables or other intermediate information during execution of instructions by processor 1102. Computer system 1100 also includes a read only memory (ROM) and/or other static storage device 1106 coupled to bus 1101 for storing static information and instructions for processor 1102. A data storage device 1107, such as a magnetic disk or optical disk, is coupled to bus 1101 for storing information and instructions. A communication device 1108, such as a modem or network Interface Card (such as Ethernet, for example) is also coupled to the bus 1101 to provide access to a network, such as shown at 808 in FIG. 8.

Computer system 1100 may also be coupled via bus 1101 to a display device 1121, such as a cathode ray tube (CRT), for displaying information to a computer user. An alphanumeric input device 1122, including alphanumeric and other keys, is typically coupled to bus 1101 for communicating information and command selections to processor 1102. Another type of user input device is cursor control 1123, such as a mouse, a trackball, or cursor direction keys for communicating direction information and command selections to processor 1102 and for controlling cursor movement on display 1121. This input device typically has two degrees of freedom in two axes, a first axis (e.g., x) and a second axis (e.g., y), which allows the device to specify positions in a plane.

Alternatively, other input devices 1124, such as a fingerprint reader, a retina scanner and/or other biometric information measuring and/or acquiring devices may be included. Alternately, a stylus or pen may be used to interact with the display. A displayed object on a computer screen may be selected by using a stylus or pen to touch the displayed object. The computer detects the selection by implementing a touch sensitive screen. Similarly, a light pen and a light sensitive screen may be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 1122, in which case all interactions therewith may be carried out via alternative input devices, such as a stylus and the written text may be interpreted using optical character recognition (OCR) techniques, for example.

The present invention is related to the use of computer system 1100 to provide methods and systems for carrying out contingency-dependent payments via secure electronic FSP drafts supported by letters of credit and/or performance bonds. According to one embodiment, the methods according to the present invention are implemented by one or more computer systems 1100 in response to processor(s) 1102 executing sequences of instructions contained in memory 1104. Such instructions may be read into memory 1104 from another computer-readable medium, such as data storage device 1107. Execution of the sequences of instructions contained in memory 1104 causes processor(s) 1102 to perform the process steps that are described above. In alternative embodiments, hard-wired circuitry may be used in place of or in combination with software instructions to implement all or selected portions of the present invention. Thus, the present invention is not limited to any specific combination of hardware circuitry and software.

While the foregoing detailed description has described preferred embodiments of the present invention, it is to be understood that the above description is illustrative only and not limiting of the disclosed invention. Indeed, those of skill in this art will recognize other alternative embodiments and all such embodiments are deemed to fall within the scope of the present invention. Thus, the present invention should be limited only by the claims as set forth below.

What is claimed is:

1. A computer-implemented method of carrying out an electronic transaction that includes a payment from a buyer to a seller via a secure electronic draft, comprising the steps of:
   storing on a server a document comprising the draft and a set of contingencies for releasing payment on the draft to the seller via a financial service provider;
   assigning at least one secondary party to the transaction to at least one contingency of the set of contingencies;
   linking a website to the server;
   providing the buyer and the seller access to the transaction via the website;
   providing restricted access to the contingencies to the secondary parties via the website, the restricted access enabling each secondary party to access only the at least one contingency assigned to the secondary party;
   authenticating the secondary party at the website;
   based on the authentication, retrieving the assigned at least one contingency from the document and displaying the retrieved at least one contingency to the authenticated secondary party;
   receiving, via an interaction between the displayed at least one contingency and a user interface of the authenticated secondary party, a request for removal of the contingency assigned to the authenticated secondary party;
   responsive to the request, removing the at least one contingency assigned to the authenticated secondary party;
   tracking removal of the set of contingencies at the server;
   determining that each of the contingencies has been removed; and
   based on the determination, releasing the payment to the seller via the financial service provider using the draft from the document.

2. The method of claim 1, wherein the contingency includes at least one of a shipment of goods, a promise to ship the goods, a performance of services, a promise to perform services, a shipping date restriction, a performance date restriction and inspection of the goods.

3. The method of claim 1, wherein the financial service provider includes a bank.

4. The method of claim 1, wherein the releasing step includes a step of sequestering funds of the buyer on deposit with the financial service provider, the sequestered funds being at least equal to a portion of the payment on the draft.

5. The method of claim 1, wherein a portion of the payment originates from a first letter of credit of the buyer.

6. The method of claim 5, wherein the first letter of credit is effective for a predetermined time period.

7. The method of claim 5, wherein the financial service provider further carries out a step of charging the buyer a fee for an establishment of the first letter of credit.

8. The method of claim 7, further comprising the step of debiting the fee from the funds of the buyer on deposit with the financial service provider.

9. The method of claim 5, wherein the first letter of credit increases a value of the buyer's funds on deposit with the financial service provider only for purposes of determining whether sufficient funds are available to release payment on the draft.

10. The method of claim 5, wherein the first letter of credit is effective for one of a single electronic transaction and multiple electronic transactions.

11. The method of claim 5, further comprising the step of providing the buyer with secure and restricted access to an accounting of a status of the first letter of credit via the web site.

12. The method of claim 1, further comprising the step of granting the financial service provider a security interest in goods received exchange for the released payment.

13. The method of claim 1, further comprising the step of creating a first online performance bond linked to the seller, the first performance bond releasing first liquidated damages to the buyer upon failure of the seller to perform according to terms of the electronic transaction.

14. The method of claim 13, further comprising the step of sequestering the first liquidated damages from an account of the seller until the seller performs according to the terms of the electronic transaction or is excused from performing.

15. The method of claim 13, further comprising the step of creating a second online letter of credit linked to the seller and wherein at least a portion of the first liquidated damages originates from the second online letter of credit when funds available to the seller are insufficient to release payment of the first liquidated damages to the buyer.

16. The method of claim 1, further comprising the step of creating a second online performance bond linked to a buyer, the second online performance bond releasing second liquidated damages to the seller in a case wherein the buyer fails to perform according to terms of the electronic transaction.

17. The method of claim 16, further comprising the step of sequestering the second liquidated damages from an account of the buyer until the buyer performs according to the terms of the electronic transaction or is excused from performing.

18. The method of claim 16, wherein at least a portion of the second liquidated damages originates from the credit extended to the buyer when the funds of the buyer on deposit with the financial service provider are insufficient to cover the release of the second liquidated damages.

19. The method of claim 1, wherein the providing access to the buyer and the seller step includes authenticating the buyer and seller at the website.

20. The method of claim 1, further comprising:
   creating an online performance bond, the online performance bond defining one of first liquidated damages to be paid to the buyer upon non-performance of the seller and second liquidated damages to be paid to the seller upon non-performance of the buyer;
   determining that the buyer and the seller have performed;
   paying the first liquidated damages to the buyer only when the determining step determines that the seller has not performed according to terms of the transaction and withholding payment of the first liquidated damages otherwise, and
   paying the second liquidated damages to the seller only when the determining step determines that the buyer has not performed according to terms of the transaction and withholding payment of the second liquidated damages otherwise.

* * * * *